(12) United States Patent
Cavallaro, III et al.

(10) Patent No.: US 8,955,668 B2
(45) Date of Patent: Feb. 17, 2015

(54) GLASS SHEET GUIDANCE APPARATUS AND METHODS OF GUIDING A GLASS SHEET

(75) Inventors: Nicholas Dominic Cavallaro, III, Corning, NY (US); Keith Mitchell Hill, Horseheads, NY (US); Naiyue Zhou, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 323 days.

(21) Appl. No.: 13/598,844

(22) Filed: Aug. 30, 2012

(65) Prior Publication Data
US 2014/0061007 A1   Mar. 6, 2014

(51) Int. Cl.
B65G 21/20   (2006.01)
B65G 15/14   (2006.01)
B65G 49/06   (2006.01)

(52) U.S. Cl.
CPC .............. B65G 21/20 (2013.01); B65G 49/063 (2013.01)
USPC .................................... 198/626.5; 198/836.3

(58) Field of Classification Search
CPC .... B65G 21/20; B65G 21/2054; B65G 15/14; B65G 49/06; B65G 49/063
USPC ....................... 198/836.1, 836.3, 626.1–626.6
See application file for complete search history.

(56) References Cited

U.S. PATENT DOCUMENTS

| | | | |
|---|---|---|---|
| 6,101,845 A * | 8/2000 | Kojima et al. .................. 65/101 |
| 6,311,523 B1 | 11/2001 | Kojima et al. ................. 65/25.3 |
| 6,454,084 B2 | 9/2002 | Csiki et al. ................. 198/836.1 |
| 6,609,611 B1 | 8/2003 | Lenhardt .................... 198/836.3 |
| 6,681,916 B2 | 1/2004 | Hiroki ........................ 198/347.1 |
| 7,217,077 B2 * | 5/2007 | Mercure ....................... 414/398 |
| 7,690,870 B2 | 4/2010 | Lisec .............................. 406/92 |
| 7,717,254 B2 | 5/2010 | Brackley et al. ........... 198/836.3 |
| 7,815,041 B2 | 10/2010 | Guenther .................... 198/836.3 |
| 8,757,355 B2 * | 6/2014 | Weigl ........................... 198/379 |
| 2005/0103055 A1 | 5/2005 | Gfeller et al. .................. 65/112 |
| 2005/0109588 A1* | 5/2005 | Gariglio ........................ 198/817 |
| 2005/0269187 A1* | 12/2005 | Jenkins et al. ............. 198/626.5 |
| 2008/0110205 A1* | 5/2008 | Adriaansen et al. ......... 65/29.12 |
| 2010/0258993 A1* | 10/2010 | Zhou et al. ...................... 269/20 |
| 2011/0079493 A1 | 4/2011 | Bell et al. .................... 198/836.3 |
| 2013/0301961 A1* | 11/2013 | Kudva et al. .................... 384/12 |

FOREIGN PATENT DOCUMENTS

JP   2012-136361   7/2012

\* cited by examiner

*Primary Examiner* — Mark A Deuble
(74) *Attorney, Agent, or Firm* — Ryan T. Hardee

(57) ABSTRACT

A glass sheet guidance apparatus includes a guidance member extending adjacent a conveyance path. In one example, an adjustment device selectively adjusts a length of the guidance member extending between a first holding structure and a second holding structure. In another example, the glass sheet guidance apparatus is configured to traverse a length of the guidance member and the glass sheet in a common direction of a conveyance path. Further examples include methods of guiding a glass sheet with the glass sheet guidance apparatus. In still further examples a method of manufacturing a glass sheet includes guiding the glass sheet.

23 Claims, 11 Drawing Sheets

GLASS SHEET GUIDANCE APPARATUS AND METHODS OF GUIDING A GLASS SHEET

TECHNICAL FIELD

The invention relates to apparatus and methods for guiding glass sheets and, more particular, to a method of manufacturing a glass sheet including guiding the glass sheet.

BACKGROUND

It is known to use a sheet guidance apparatus to guide glass sheets used in the manufacture of display devices. For example, U.S. Pat. No. 7,717,254 to Brackley et al. discloses a glass sheet guidance system including a guidance member that can be held taut by a tension member.

SUMMARY

The following presents a simplified summary of the disclosure in order to provide a basic understanding of some example aspects described in the detailed description.

In one example aspect, a glass sheet guidance apparatus includes a guidance member extending adjacent a conveyance path along which a glass sheet is configured to traverse. A first holding structure is positioned with respect to the conveyance path. The first holding structure supports a first end portion of the guidance member. A second holding structure is spaced apart from the first holding structure and positioned with respect to the conveyance path. The second holding structure includes an adjustment device supporting an opposing second end portion of the guidance member. The adjustment device is configured to selectively adjust a length of the guidance member extending between the first holding structure and the second holding structure.

In one example of the aspect, the guidance member includes a wire.

In another example of the aspect, the guidance member is conformable to substantially match a shape of the glass sheet.

In still another example of the aspect, at least one of the first holding structure and second holding structure includes an adjustment slide, the adjustment slide being configured to move the guidance member along at least one axis.

In yet another example of the aspect, an extension structure is removably attached to the second holding structure.

In a further example of the aspect, the extension structure extends adjacent the conveyance path, the extension structure supporting a second guidance member configured to extend along the conveyance path.

In yet another example of the aspect, the extension structure includes a tension member attached to a first end portion of the second guidance member.

In a further example of the aspect, the extension structure includes an adjustment device attached to an opposing second end portion of the second guidance member, the adjustment device is configured to selectively adjust a length of the second guidance member extending between the tension member and the adjustment device.

In yet a further example of the aspect, the first holding structure includes a pair of first holding structures, each of the first holding structures being positioned on an opposing side of the conveyance path.

In still a further example of the aspect, the second holding structure includes a pair of second holding structures, each of the second holding structures being positioned on an opposing side of the conveyance path.

In another example aspect, a method of guiding a glass sheet comprises the step of providing a first holding structure for supporting a first end portion of a guidance member. The method further comprises the step of providing a second holding structure spaced apart from the first holding structure and having an adjustment device for supporting an opposing second end portion of the guidance member. The guidance member extends adjacent a conveyance path along which the glass sheet traverses. The method further comprises the step of adjusting a length of the guidance member with the adjustment device by changing the length of the guidance member extending between the first holding structure and second holding structure based on a thickness of the glass sheet. The method further comprises the step of moving the glass sheet along the conveyance path.

In one example of the aspect, the method includes the step of attaching an extension structure to the second holding structure, the extension structure being positioned with respect to the conveyance path.

In another example of the aspect, the method includes the step of supporting a second guidance member with the extension structure such that the second guidance member extends adjacent the conveyance path along which the glass sheet traverses. \

In yet another example of the aspect, the step of adjusting the length of the second guidance member based on the thickness of the glass sheet.

In still another example of the aspect, the guidance member includes a wire.

In yet another example aspect, a method of manufacturing a glass sheet includes guiding the glass sheet. Guiding the glass sheet comprises the step of providing a guidance member extending adjacent a conveyance path. Guiding the glass sheet further includes the step of providing a first holding structure supporting a first portion of the guidance member. Guiding the glass sheet still further includes the step of providing a second holding structure supporting a second portion of the guidance member such that a length of the guidance member spans between the first holding structure and the second holding structure adjacent the conveyance path. Guiding the glass sheet further includes the step of traversing the length of the guidance member and the glass sheet in a common direction of the conveyance path, wherein the length of the guidance member guides the glass sheet along the conveyance path.

In one example of the aspect, the length of the guidance member and the glass sheet both travel at substantially the same speed along the common direction of the conveyance path.

In another example of the aspect, the guidance member comprises an endless guidance member that travels in a looped path about the first and second holding structures.

In yet another example of the aspect, the guidance member is unwound from the first holding structure and wound on the second holding structure as the length of the guidance member traverses along the common direction of the conveyance path.

In still another example of the aspect, the length of the guidance member conforms to substantially match a shape of the glass sheet.

BRIEF DESCRIPTION OF THE DRAWINGS

These and other aspects are better understood when the following detailed description is read with reference to the accompanying drawings, in which.

DETAILED DESCRIPTION

Figure 1:
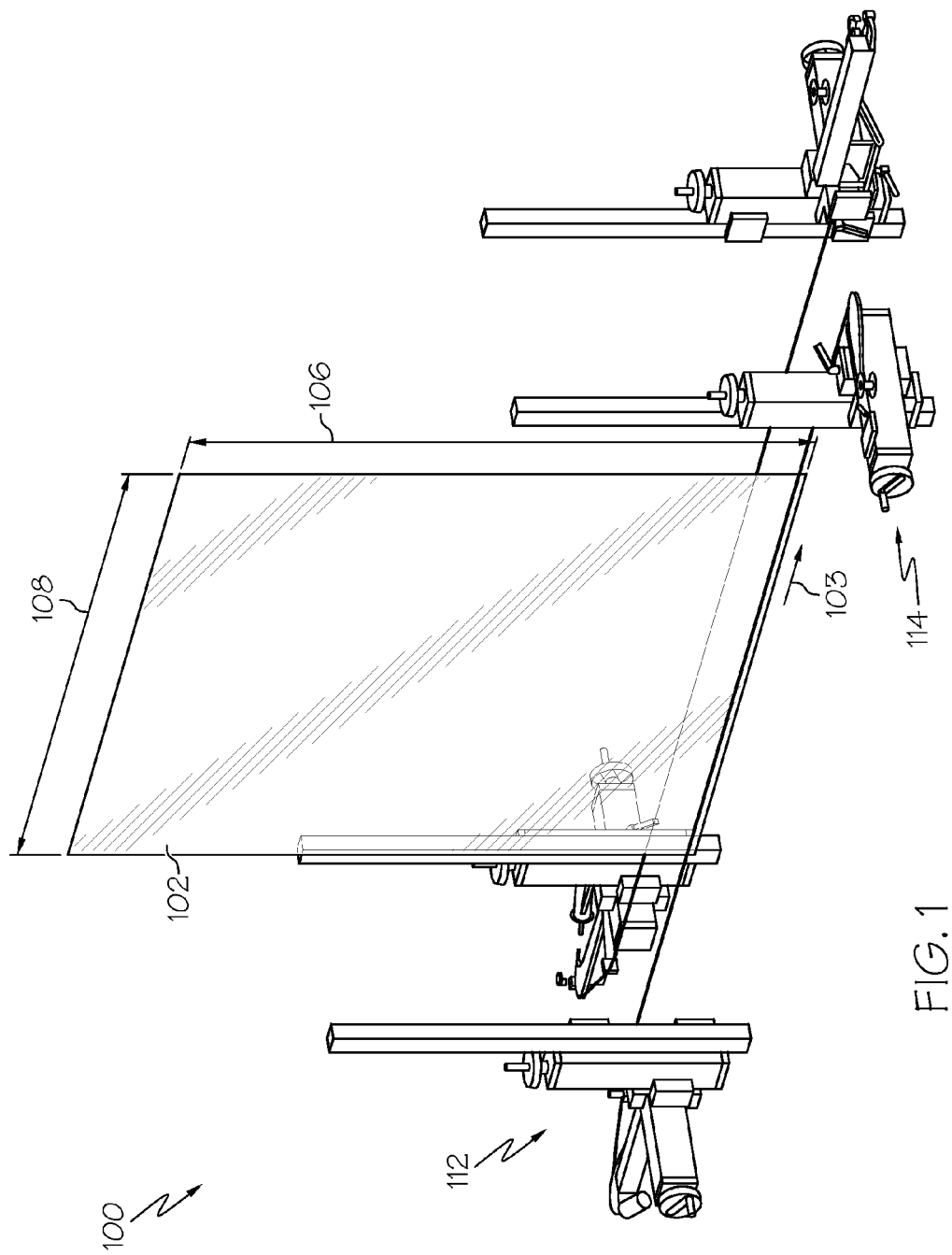
FIG. 1 is a perspective view of an example glass sheet guidance apparatus of a glass manufacturing apparatus in accordance with one aspect of the disclosure.

Examples will now be described more fully hereinafter with reference to the accompanying drawings in which example embodiments are shown. Whenever possible, the same reference numerals are used throughout the drawings to refer to the same or like parts. However, aspects may be embodied in many different forms and should not be construed as limited to the embodiments set forth herein.

FIG. 1 illustrates a perspective view of a glass sheet guidance apparatus 100 of a glass manufacturing apparatus incorporating example aspects of the disclosure. The glass manufacturing apparatus may be provided to fabricate glass sheets wherein the glass sheet guidance apparatus of the various examples of the disclosure can facilitate guidance of the glass sheets during a method of manufacturing glass sheets. The glass sheet guidance apparatus 100 can include a wide variety of configurations including various designs, sizes, shapes, and/or functional features designed to guide a glass sheet 102 along a conveyance path 103. The glass sheet 102 can have a height 106, width 108, and thickness 110 (shown in FIG. 2). Apparatus of the present disclosure may be used with a wide range of thicknesses and can accommodate conveyance of relatively thin glass sheets with the thickness in a range of from about 0.1 to about 0.7 mm, such as about 0.3 mm. The glass sheet 102 can include a number of different types of glass sheets, such as glass sheets for use in display manufacture, LCD, etc. As such, the glass sheet 102 shown in FIG. 1 includes a variety of sizes and shapes, and in further examples, could be larger or smaller than as shown and/or may include a non-planar shape, such as by having bends, bowing, etc.

The glass sheet guidance apparatus 100 may include one or more holding structures positioned on each side of the glass sheet 102. For example, the glass sheet guidance apparatus 100 can include a first holding structure 112 and a second holding structure 114. The first holding structure 112 and second holding structure 114 can be disposed on one side of the glass sheet 102. In further examples, as shown in FIG. 1, the holding structures can be positioned on both sides of the glass sheet 102. As will be described in more detail below, the holding structures can function to guide the glass sheet 102 along the conveyance path 103.

Figure 2:
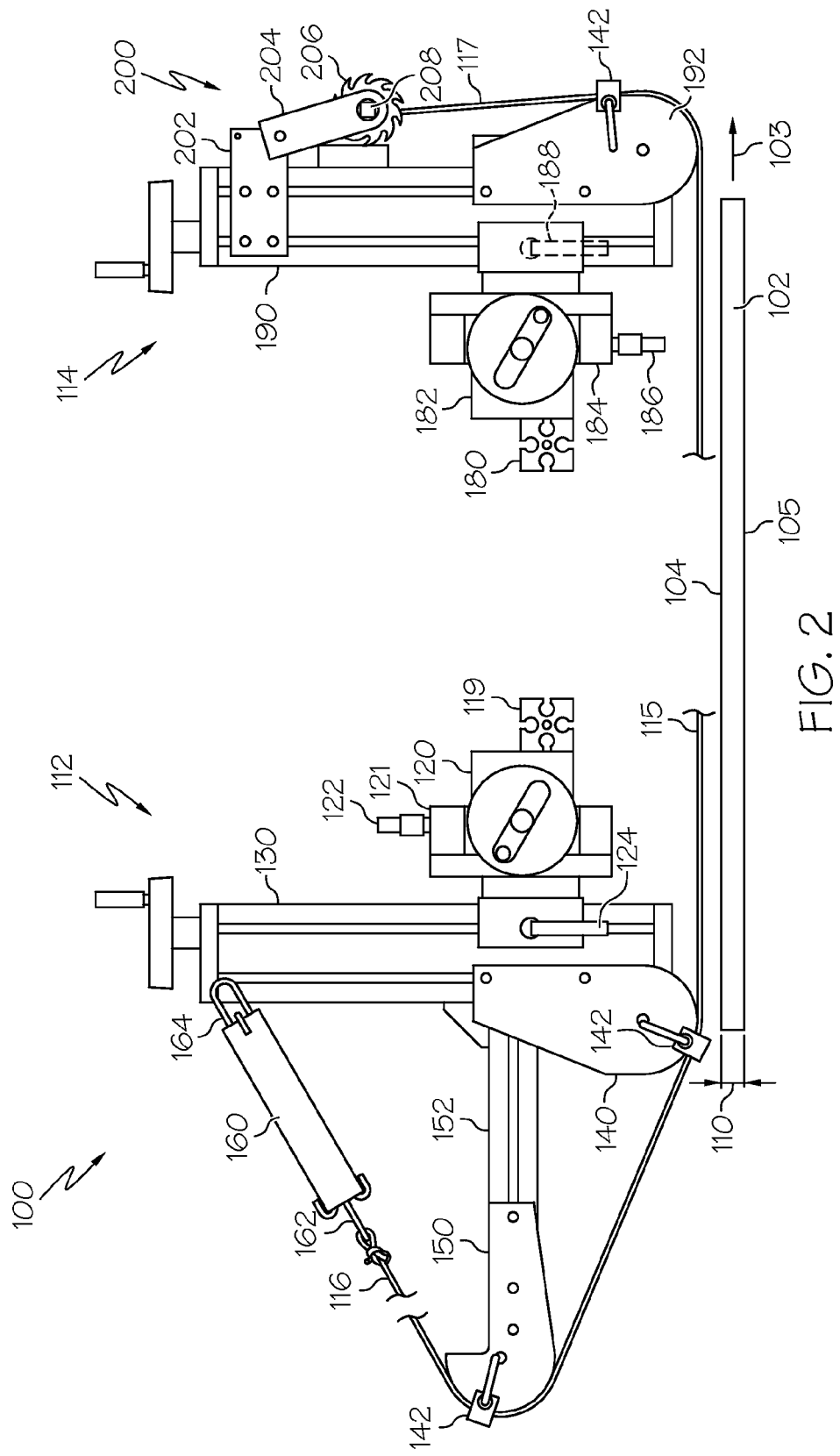
FIG. 2 is a top view of the example glass sheet guidance apparatus including a first holding structure and a second holding structure.

Turning now to FIG. 2, a top view of the glass sheet guidance apparatus 100 is shown. In this example, the first holding structure 112 and second holding structure 114 are shown to be positioned on one side of the glass sheet 102. While the holding structures are shown to be positioned on only a first side 104 of the glass sheet 102, in further examples, the holding structures could be positioned on both the first side 104 and an opposing second side 105 of the glass sheet. In such an example, the holding structures positioned on the second side 105 of the glass sheet 102 can be similar or identical to the holding structures positioned on the first side 104, as shown.

The glass sheet guidance apparatus 100 can include a guidance member 115 extending between the first holding structure 112 and the second holding structure 114. The guidance member 115 can extend adjacent the conveyance path 103 along which the glass sheet 102 traverses. The guidance member 115 can be supported at a first end portion 116 by the first holding structure 112 and at an opposing second end portion 117 by the second holding structure 114. The guidance member 115 can include any number of structures that can abut the conveyance path 103 and guide the glass sheet 102. For example, the guidance member 115 can include wires, cables, etc.

The guidance member 115 can have a relatively small contact area with the glass sheet 102. The guidance member 115 can include any number of materials depending on the particular application, and could include metal or non-metal materials, such as stainless steel, or the like. In further examples, the guidance member 115 could include heat resistant materials for use in relatively high temperature applications. Similarly, the guidance member 115 could include one or more coatings to increase or reduce the friction between the guidance member 115 and the glass sheet 102. The guidance member 115 could include any number of cross-sectional shapes, such as circular, oval, square, etc.

The guidance member 115 is conformable to substantially match a shape of the glass sheet 102. As shown in FIGS. 1 and 2, the glass sheet 102 is shown to be substantially planar. In addition or alternatively, the glass sheet 102 may include bends, bows, curves, or other nonplanar shapes. Accordingly, as the glass sheet 102 traverses along the conveyance path 103, the glass sheet 102 may contact the guidance member 115. The guidance member 115 can deform slightly while guiding the glass sheet 102 and maintaining the glass sheet 102 within the conveyance path 103. In particular, the guidance member 115 can deform slightly to match the shape of the glass sheet 102.

The first holding structure 112 will now be described in more detail. The first holding structure 112 can be attached to a first support structure 119. The first support structure 119 includes a generally elongate rail extending in a vertical direction. The first support structure 119 is not limited to extending in the vertical direction, however, and could extend along a horizontal direction, or other directions that are neither horizontal nor vertical. Similarly, the first support structure 119 is not limited to the elongate rail structure as shown, and could include any number of structures that can support the first holding structure 112. While the first support structure 119 is depicted as a stand-alone structure, it is not limited to such a construction. Indeed, in further examples, the first support structure 119 could be attached and/or included as a part of any number of structures or apparatuses involved in glass making, including, but not limited to, a traveling anvil machine, a vertical bead score, etc. As such, the first support structure 119 comprises only one possible structure to which the first holding structure 112 may be attached.

The first holding structure 112 can further include a first adjustment slide 120. The first adjustment slide 120 can be attached to the first support structure 119. The first adjustment slide 120 can extend generally parallel with respect to the first support structure 119 in a vertical direction. In particular, the first adjustment slide 120 can extend along a direction that is generally parallel to a plane of the glass sheet 102 and transverse to the conveyance path 103. The first adjustment slide 120 can be fixedly attached to the first support structure 119, such that the first adjustment slide 120 extends in a generally vertical direction (e.g., up and down). However, it is to be understood that the first adjustment slide 120 is not limited to this orientation. In further examples, the first adjustment slide 120 could be attached at an angle with respect to the first support structure 119 such that the first adjustment slide 120 is non-parallel with respect to the first support structure 119.

The first holding structure 112 can further include a positioning structure 121. The positioning structure 121 can be movably attached to the first adjustment slide 120. In particular, the positioning structure 121 can move with respect to the first adjustment slide 120 by translating along the first adjustment slide 120. In this example, since the first adjustment slide 120 extends in the generally vertical direction, the positioning structure 121 will move vertically (e.g., up and down) along the first adjustment slide 120. However, as set forth above, the first adjustment slide 120 can be attached at an angle with respect to the first support structure 119, such that the positioning structure 121 is not limited to moving vertically. As such, the first support structure 119 can move the first holding structure 112 vertically in a direction that is transverse to the conveyance path 103. The first support structure 119 can be moved, for example, to adjust for varying sizes (e.g., height 106) of the glass sheet 102.

The positioning structure 121 can further include a first locking mechanism 122. The first locking mechanism 122 can be attached to the positioning structure 121 and can allow for selective movement of the positioning structure 121 with respect to the first adjustment slide 120. In particular, the first locking mechanism 122 can function similarly to a locking structure, or the like, such that the first locking mechanism 122 can selectively lock the positioning structure 121 in place with respect to the first adjustment slide 120. When the first locking mechanism 122 is moved to the locked position, the positioning structure 121 is limited from moving with respect to the first adjustment slide 120. The first locking mechanism 122 could selectively be moved to the unlocked position, in which the positioning structure 121 is free to move with respect to the first adjustment slide 120. The first locking mechanism 122 is not specifically limited to the handle-like structure shown in FIG. 2, and in further examples, could include any number of structures and/or devices that selectively lock the positioning structure 121 to the first adjustment slide 120. For example, the first locking mechanism 122 could include nearly any type of mechanical fastener, such as nuts and bolts, threading attachments, etc.

The first holding structure 112 can further include a second adjustment slide 130. The second adjustment slide 130 can be similar or identical in structure to the first adjustment slide 120. The second adjustment slide 130 can be attached to the positioning structure 121. In particular, the second adjustment slide 130 can be movably attached to the positioning structure 121, such that the second adjustment slide 130 can move with respect to the positioning structure 121. The second adjustment slide 130 can move by translating along a generally longitudinal axis.

The second adjustment slide 130 can be positioned to extend along a different direction than the first adjustment slide 120. In one example, the second adjustment slide 130 can extend in a direction that is transverse with respect to the first support structure 119 in a horizontal direction. In particular, the second adjustment slide 130 can extend along a direction that is generally transverse to a plane of the glass sheet 102 and to the conveyance path 103. As such, in this example, the second adjustment slide 130 can move the first holding structure 112 in a horizontal direction (e.g., towards and away from the glass sheet 102). However, it is to be understood that the second adjustment slide 130 is not limited to this orientation. In further examples, the second adjustment slide 130 could be attached at an angle with respect to the first support structure 119, such that the second adjustment slide 130 can move at an angle (e.g., non-horizontal direction) with respect to the first support structure 119.

The positioning structure 121 can further include a second locking mechanism 124. The second locking mechanism 124 can be similar or identical to the first locking mechanism 122. In particular, the second locking mechanism 124 can be attached to the positioning structure 121 and can allow for selective movement of the second adjustment slide 130. The second locking mechanism 124 can function similarly to a locking structure and can selectively lock the second adjustment slide 130 in place with respect to the first adjustment slide 120. For example, when the second locking mechanism 124 is moved to the locked position, the second adjustment slide 130 is limited from moving with respect to the first adjustment slide 120. The second locking mechanism 124 could selectively be moved to the unlocked position, in which the second adjustment slide 130 is free to move with respect to the positioning structure 121 and the first adjustment slide 120. The second locking mechanism 124 is not specifically limited to the structure shown in FIG. 2, and in further examples, could include any number of structures and/or devices that selectively lock the second adjustment slide 130 to the first adjustment slide 120. For example, the second locking mechanism 124 could include nearly any type of mechanical fastener, such as nuts and bolts, threading attachments, etc.

The first and second adjustment slides 120, 130 and the positioning structure 121 are not specifically limited to the example shown in FIG. 2. Rather, other structures and/or constructions are envisioned for adjusting the first holding structure 112 with respect to the glass sheet 102. For instance, in one possible example, the positions of the first adjustment slide 120 and second adjustment slide 130 could be reversed. In this example, the second adjustment slide 130 could be attached directly to the first support structure 119 while the first adjustment slide 120 could be attached to the second adjustment slide 130. In other examples, the first adjustment slide 120 and second adjustment slide 130 are not limited to extending along a generally vertical axis and horizontal axis, respectively. Rather, the first adjustment slide 120 and second adjustment slide 130 could extend along virtually any direction. In yet another example, the first holding structure 112 may not include both of the adjustment slides, and, instead, could include only one of the first adjustment slide 120 and second adjustment slide 130.

Referring still to FIG. 2, the first holding structure 112 can further include a first guide structure 140. The first guide structure 140 can be attached to the second adjustment slide 130. In further examples, the first guide structure 140 could instead be attached to at least one of the first support structure 119, first adjustment slide 120, or the second adjustment slide 130. The first guide structure 140 can be attached in any number of ways, such as with mechanical fasteners (e.g., nuts, bolts, screws, etc.), welding, adhesives, or the like. The first guide structure 140 can function to support and guide the guidance member 115, such that the guidance member 115 is maintained to extend adjacent the conveyance path 103. The first guide structure 140 could include a stationary (e.g., non-moving) member, as shown. In further examples, however, the first guide structure 140 could also include a moving member, such as a roller, circular roller, or the like. The first guide structure 140 can include an alignment groove into which the guidance member 115 can be received. The guidance member 115 can have a larger cross-sectional width than the alignment groove, such that the guidance member 115 can protrude outwardly from the first guide structure 140.

The first holding structure 112 can further include a second guide structure 150. The second guide structure 150 can be attached to the second adjustment slide 130, such as with an attachment arm 152. The attachment arm 152 is not limited to the shown structure, and could be longer or shorter. In further examples, second guide structure 150 can be attached directly to the second adjustment slide 130, such that the attachment arm 152 may not be included. The second guide structure 150 can be similar in function to the first guide structure 140. In particular, the second guide structure 150 can function to support and guide the guidance member 115. In this example, the guidance member 115 can wind at least partially around the second guide structure 150. The second guide structure 150 could include a stationary (e.g., non-moving) member, as shown. However, in further examples, the second guide structure 150 could include a moving member, such as a roller, circular roller, or the like. The second guide structure 150 can further include an alignment groove into which the guidance member 115 can be received.

The first guide structure 140 and second guide structure 150 can each include an alignment structure 142. The alignment structure 142 can maintain the guidance member 115 in contact with the first guide structure 140 and second guide structure 150. In particular, the alignment structure 142 can ensure that the guidance member 115 remains in contact with the guide structures and within the alignment groove. The alignment structure 142 can include any number of structures, and is not limited to the example shown in FIG. 2.

The first holding structure 112 can further include a tension member 160. The tension member 160 can extend along a generally linear axis between a first end portion 162 and an opposing second end portion 164. The tension member 160 can include a biasing member, such as a spring. The second end portion 164 of the tension member 160 can be attached to the second adjustment slide 130. The first end portion 162 of the tension member 160 can be attached to the first end portion 116 of the guidance member 115. The tension member 160 can be flexible, such as by being capable of increasing or decreasing in length. By being flexible, the tension member 160 can keep the guidance member 115 taut, such that if a length of the guidance member 115 changes, the guidance member 115 can still remain taut. In further examples, the tension member 160 can be removed and/or replaced, so as to adjust the elasticity of the tension member 160. The tension member 160 is not limited to being attached to the second adjustment slide 130 at the second end portion 164, and in further examples, could be attached to nearly any non-moving or fixed structure.

Referring still to FIG. 2, the glass sheet guidance apparatus 100 can further include the second holding structure 114. The second holding structure 114 can be attached to a second support structure 180. The second support structure 180 can be identical in structure and function as the first support structure 119 described above. For example, the second support structure 180 includes a generally elongate rail extending in a vertical direction. The second support structure 180 is not limited to extending in the vertical direction, however, and could extend along a horizontal direction, or other directions that are neither horizontal nor vertical. Similarly, the second support structure 180 is not limited to the elongate rail as shown, and could include any number of structures that can support the second holding structure 114. While the second support structure 180 is depicted as a stand-alone structure, it is not limited to such a construction. Indeed, in further examples, the second support structure 180 could be attached and/or included as a part of any number of structures involved in glass making, including, but not limited to, a traveling anvil machine, a vertical bead score, etc. As such, the second support structure 180 comprises only one possible example structure to which the second holding structure 114 may be attached.

The second holding structure 114 can further include a first adjustment slide 182. The first adjustment slide 182 can be identical in structure and function as the first adjustment slide 120 described above. For example, the first adjustment slide 182 can be attached to the second support structure 180. The first adjustment slide 182 can extend generally parallel with respect to the second support structure 180 in a vertical direction. In particular, the first adjustment slide 182 can extend along a direction that is generally parallel to a plane of the glass sheet 102 and transverse to the conveyance path 103. The first adjustment slide 182 can be fixedly attached to the second support structure 180, such that the first adjustment slide 182 extends in a generally vertical direction (e.g., up and down). However, it is to be understood that the first adjustment slide 182 is not limited to this orientation. In further examples, the first adjustment slide 182 could be attached at an angle with respect to the second support structure 180 such that the first adjustment slide 182 is non-parallel with respect to the second support structure 180.

The second holding structure 114 can further include a positioning structure 184. The positioning structure 184 can be identical in structure and function to the positioning structure 121 described above. For example, the positioning structure 184 can be movably attached to the first adjustment slide 182. In particular, the positioning structure 184 can move with respect to the second support structure 180 by translating along the first adjustment slide 182. In this example, since the first adjustment slide 182 extends in the generally vertical direction, the positioning structure 184 will move generally vertically (e.g., up and down) along the first adjustment slide 182. However, as set forth above, the first adjustment slide 182 can be attached at an angle with respect to the second support structure 180, such that the positioning structure 184 is not limited to moving vertically.

The positioning structure 184 can further include a first locking mechanism 186. The first locking mechanism 186 can be identical in structure and function as the first locking mechanism 122 described above. For example, the first locking mechanism 186 can be attached to the positioning structure 184 and can allow for selective movement of the positioning structure 184 with respect to the first adjustment slide 182. In particular, the first locking mechanism 186 can function similarly to a locking structure, or the like, such that the first locking mechanism 186 can selectively lock the positioning structure 184 in place with respect to the first adjustment slide 182. When the first locking mechanism 186 is moved to the locked position, the positioning structure 184 is limited from moving with respect to the first adjustment slide 182. The first locking mechanism 186 could selectively be moved to the unlocked position, in which the positioning structure 184 is free to move with respect to the first adjustment slide 182. The first locking mechanism 186 is not specifically limited to the handle-like structure shown in FIG. 2, and in further examples, could include any number of structures and/or devices that selectively lock the positioning structure 184 to the first adjustment slide 182. For example, the first locking mechanism 186 could include nearly any type of mechanical fastener, such as nuts and bolts, threading attachments, etc.

The second holding structure 114 can further include a second adjustment slide 190. The second adjustment slide 190 can be identical in structure and function as the second adjustment slide 130 described above. The second adjustment slide 190 can be attached to the positioning structure 184. In particular, the second adjustment slide 190 can be movably attached to the positioning structure 184, such that the second adjustment slide 190 can move with respect to the positioning structure 184. The second adjustment slide 190 can move by translating along a generally longitudinal axis.

The second adjustment slide 190 can be positioned to extend along a different direction than the first adjustment slide 182. In one example, the second adjustment slide 190 can extend in a direction that is transverse with respect to the second support structure 180 in a horizontal direction. In particular, the second adjustment slide 190 can extend along a direction that is generally transverse to a plane of the glass sheet 102 and to the conveyance path 103. As such, in this example, the second adjustment slide 190 can move the second holding structure 114 in a horizontal direction (e.g., towards and away from the glass sheet 102). However, it is to be understood that the second adjustment slide 190 is not limited to this orientation. In further examples, the second adjustment slide 190 could be attached at an angle with respect to the second support structure 180, such that the second adjustment slide 190 can move at an angle (e.g., non-horizontal direction) with respect to the second support structure 180.

The positioning structure 184 can further include a second locking mechanism 188. The second locking mechanism 188 can be identical in structure and function as the second locking mechanism 124 described above. The second locking mechanism 188 can be attached to the positioning structure 184 and can allow for selective movement of the second adjustment slide 190. The second locking mechanism 188 can function similarly to a locking structure and can selectively lock the second adjustment slide 190 in place with respect to the first adjustment slide 182. For example, when the second locking mechanism 188 is moved to the locked position, the second adjustment slide 190 is limited from moving with respect to the first adjustment slide 182. The second locking mechanism 188 could selectively be moved to the unlocked position, in which the second adjustment slide 190 is free to move with respect to the positioning structure 184 and the first adjustment slide 182. The second locking mechanism 188 is not specifically limited to the structure shown in FIG. 2, and in further examples, could include any number of structures and/or devices that selectively lock the second adjustment slide 190 to the first adjustment slide 182. For example, the second locking mechanism 188 could include nearly any type of mechanical fastener, such as nuts and bolts, threading attachments, etc.

The second locking mechanism 188 is shown in phantom in FIG. 2 because the second locking mechanism 188 is normally not visible in such a view. In particular, the second locking mechanism 188 can be positioned at a lower side of the positioning structure 184. However, the second locking mechanism 188 is not limited to such a location, and in further examples, could be positioned at an upper side of the positioning structure 184, in a similar location as the second locking mechanism 124 is positioned in the first holding structure 112.

The second holding structure 114 can further include a third guide structure 192. The third guide structure 192 can be similar or identical in structure and function as the first guide structure 140 described above. For example, the third guide structure 192 can be attached to the second adjustment slide 190. The third guide structure 192 can be attached in any number of ways, such as with mechanical fasteners (e.g., nuts, bolts, screws, etc.), welding, adhesives, or the like. The third guide structure 192 can function to support and guide the second end portion 117 of the guidance member 115, such that the guidance member 115 is maintained to extend adjacent the conveyance path 103. The third guide structure 192 can include a stationary (e.g., non-moving) member, as shown. In further examples, however, the third guide structure 192 could also include a moving member, such as a roller, circular roller, or the like. As with the first guide structure 140 and second guide structure 150 described above, the third guide structure 192 can further include an alignment groove into which the guidance member 115 can be received. The guidance member 115 can protrude outwardly from the alignment groove of the third guide structure 192.

The second holding structure 114 can further include an adjustment device 200. The adjustment device 200 can support the second end portion 117 of the guidance member 115 opposite the first end portion 116. As will be described in detail below, the adjustment device 200 can selectively adjust a length of the guidance member 115 extending between the first holding structure 112 and the second holding structure 114.

The adjustment device 200 can be attached to the second adjustment slide 190. In one example, the adjustment device 200 can include an attachment structure 202 for attaching the adjustment device 200 to the second adjustment slide 190. The attachment structure 202 can include a generally planar surface, such as a plate, or the like, that can be attached to the second adjustment slide 190 in any number of ways, including, but not limited to, welding, adhesives, mechanical fasteners (nuts, bolts, screws, etc.) or the like. In further examples, the attachment structure 202 is not specifically limited to being attached to the second adjustment slide 190, and could be attached to other similar fixed structures.

The adjustment device 200 can further include a base 204. The base 204 can be attached to the attachment structure 202 and can extend in a direction away from the attachment structure 202. The base 204 can be attached in any number of ways, such as with welding, adhesives, mechanical fasteners (nuts, bolts, screws, etc.) or the like. In further examples, the base 204 can be movable (e.g., pivotable) with respect to the attachment structure 202.

The adjustment device 200 can further include a gear 206. The gear 206 can be movably attached with respect to the base 204. In one example, the gear 206 can include an axle 208 extending through a center of the gear. The axle 208 can be movably attached at opposing ends to the base 204. As such, the gear 206 and axle 208 can both rotate with respect to the base 204. In operation, the second end portion 117 of the guidance member 115 can be attached to the axle 208. The gear 206 can be rotated in a clockwise or counter clockwise direction. As such, rotation of the gear 206 and axle 208 can cause the guidance member 115 to wind around the axle 208. By winding around the axle 208, the guidance member 115 is tightened, such that an overall length of the guidance member 115 extending from the first holding structure 112 to the second holding structure 114 is reduced.

The operation of the glass sheet guidance apparatus 100 can now be briefly described. The glass sheet 102 can travel along conveyance path 103. The glass sheet 102 can have a certain thickness and stiffness. Depending on thickness and stiffness of the glass sheet, the tension of the guidance member 115 can be adjusted. In particular, the gear 206 and axle 208 can be rotated to wind (e.g., tighten) or unwind (e.g., loosen) the guidance member 115. As such, the guidance member 115 can be made more or less taut based on the thickness and stiffness of the glass sheet 102. In one example, when the glass sheet 102 is thinner and/or less stiff, the guidance member 115 is less taut. In another example, when the glass sheet 102 is thicker and/or stiffer, the guidance member 115 is more taut. With the proper tension set in the guidance member 115, the glass sheet 102 can traverse along the conveyance path adjacent the guidance member 115. The guidance member 115 can maintain the glass sheet 102 within the conveyance path 103, and limit the glass sheet 102 from moving in a direction transverse to the conveyance path 103, such as towards and away from the glass sheet guidance apparatus 100.

Figure 3:
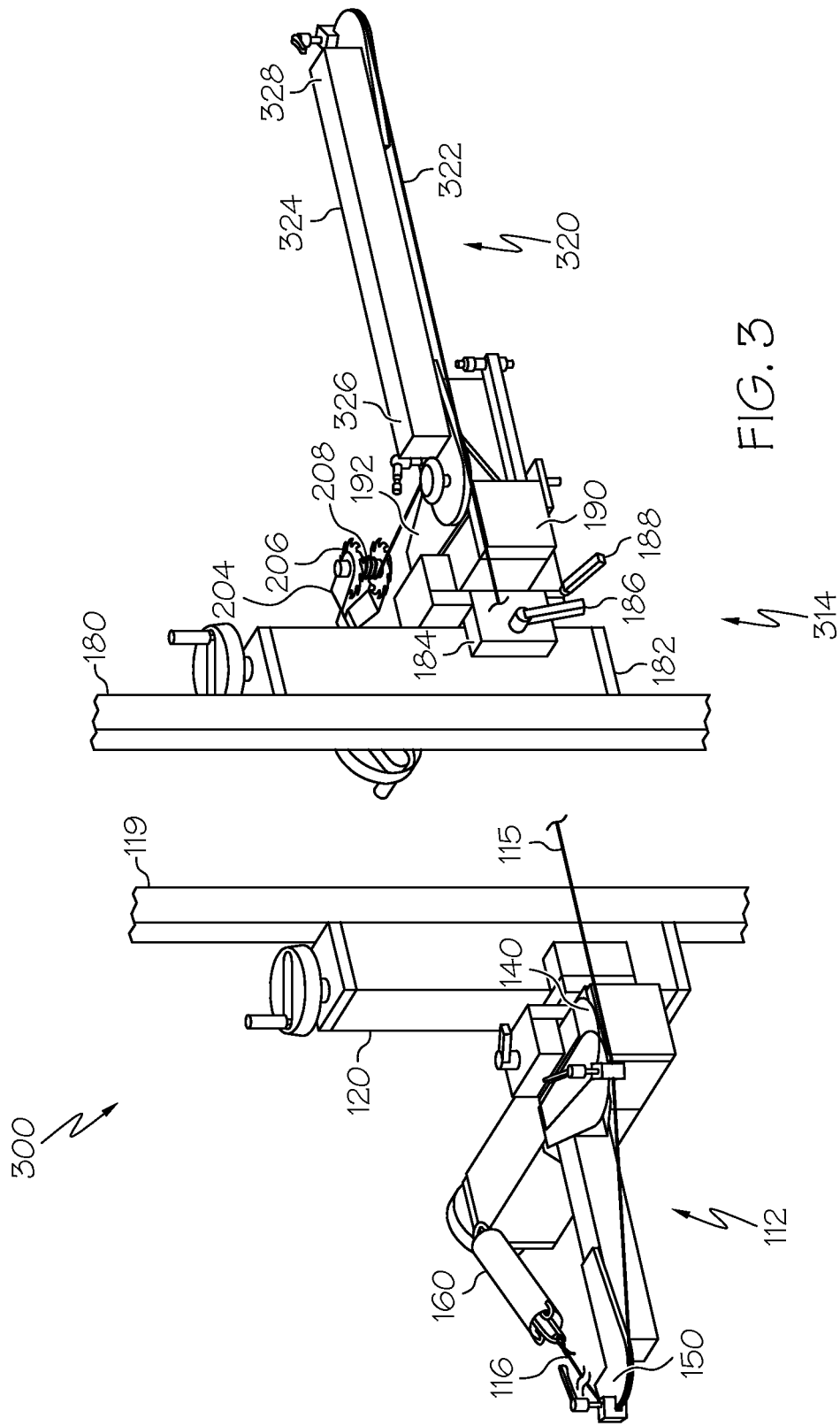
FIG. 3 is a perspective view of a second example glass sheet guidance apparatus of a glass manufacturing apparatus in accordance with one aspect.

Referring now to FIG. 3, a second example of a glass sheet guidance apparatus 300 is provided. The glass sheet guidance apparatus 300 can be used in a similar or identical environment as the glass sheet guidance apparatus 100 described above with respect to FIGS. 1 and 2. Indeed, the glass sheet guidance apparatus 300 may include one or more holding structures positioned on each side of the glass sheet 102.

The glass sheet guidance apparatus 300 can include the first holding structure 112. The first holding structure 112 can be identical in structure to the first holding structure 112 shown and described with respect to FIGS. 1 and 2. Indeed, the first holding structure 112 shown in FIG. 3 includes the first support structure 119, the first adjustment slide 120, the second adjustment slide 130, the first guide structure 140, the second guide structure 150, and the tension member 160. Similarly, the first holding structure 112 again supports the first end portion 116 of the guidance member 115.

The glass sheet guidance apparatus 300 can further include a second holding structure 314. The second holding structure 314 is spaced apart from the first holding structure 112 and positioned with respect to the conveyance path 103. As will be described in more detail below, the second holding structure 314 can include an extension structure 320 for increasing an overall length of the conveyance path 103 along which the glass sheet 102 traverses.

The second holding structure 314 can be attached to the second support structure 180. The second support structure 180 is identical in structure and function as described above with respect to the second holding structure 114. For example, the second support structure 180 includes a generally elongate rail extending in a generally vertical direction. The second support structure 180 is not limited to the elongate rail as shown, and could include any number of structures that can support the second holding structure 314. While the second support structure 180 is depicted as a stand-alone structure, it is not limited to such a construction, and could be attached and/or included as a part of any number of structures involved in glass making, including, but not limited to, a traveling anvil machine, a vertical bead score, etc.

The second holding structure 314 can further include the first adjustment slide 182. The first adjustment slide 182 is identical in structure and function as described above with respect to the second holding structure 114. For example, the first adjustment slide 182 can be attached to the second support structure 180. The first adjustment slide 182 can extend along a direction that is generally parallel to a plane of the glass sheet 102 and transverse to the conveyance path 103. The first adjustment slide 182 can be fixedly attached to the second support structure 180.

The second holding structure 314 can further include the positioning structure 184. The positioning structure 184 is identical in structure and function as described above with respect to the second holding structure 114. For example, the positioning structure 184 can be movably attached to the first adjustment slide 182. In particular, the positioning structure 184 can move with respect to the second support structure 180 by translating along the first adjustment slide 182. Since the first adjustment slide 182 extends in the generally vertical direction, the positioning structure 184 will move generally vertically (e.g., up and down) along the first adjustment slide 182.

The positioning structure 184 can further include the first locking mechanism 186. The first locking mechanism 186 is identical in structure and function as described above with respect to the second holding structure 114. For example, the first locking mechanism 186 can be attached to the positioning structure 184 and can allow for selective movement of the positioning structure 184 with respect to the first adjustment slide 182. In particular, the first locking mechanism 186 can selectively lock the positioning structure 184 in place with respect to the first adjustment slide 182. When the first locking mechanism 186 is moved to the locked position, the positioning structure 184 is limited from moving with respect to the first adjustment slide 182. The first locking mechanism 186 could selectively be moved to the unlocked position, in which the positioning structure 184 is free to move with respect to the first adjustment slide 182.

The second holding structure 314 can further include the second adjustment slide 190. The second adjustment slide 190 is identical in structure and function as described above with respect to the second holding structure 114. For example, the second adjustment slide 190 can be attached to the positioning structure 184. In particular, the second adjustment slide 190 can be movably attached to the positioning structure 184, such that the second adjustment slide 190 can move with respect to the positioning structure 184. The second adjustment slide 190 can move by translating along a generally longitudinal axis.

The second adjustment slide 190 can be positioned to extend along a different direction than the first adjustment slide 182. In one example, the second adjustment slide 190 can extend in a direction that is transverse with respect to the second support structure 180 in a horizontal direction. In particular, the second adjustment slide 190 can extend along a direction that is generally transverse to a plane of the glass sheet 102 and to the conveyance path 103. As such, in this example, the second adjustment slide 190 can move the second holding structure 314 in a horizontal direction (e.g., towards and away from the glass sheet 102). However, it is to be understood that the second adjustment slide 190 is not limited to this orientation. In further examples, the second adjustment slide 190 could be attached at an angle with respect to the second support structure 180, such that the second adjustment slide 190 can move at an angle (e.g., non-horizontal direction) with respect to the second support structure 180.

The positioning structure 184 can further include the second locking mechanism 188. The second locking mechanism 188 is identical in structure and function as described above with respect to the second holding structure 114. The second locking mechanism 188 can be attached to the positioning structure 184 and can allow for selective movement of the second adjustment slide 190 by selectively locking the second adjustment slide 190 in place with respect to the first adjustment slide 182. In one example, when the second locking mechanism 188 is moved to the locked position, the second adjustment slide 190 is limited from moving with respect to the first adjustment slide 182. The second locking mechanism 188 could selectively be moved to the unlocked position, in which the second adjustment slide 190 is free to move with respect to the positioning structure 184 and the first adjustment slide 182.

Figure 4:
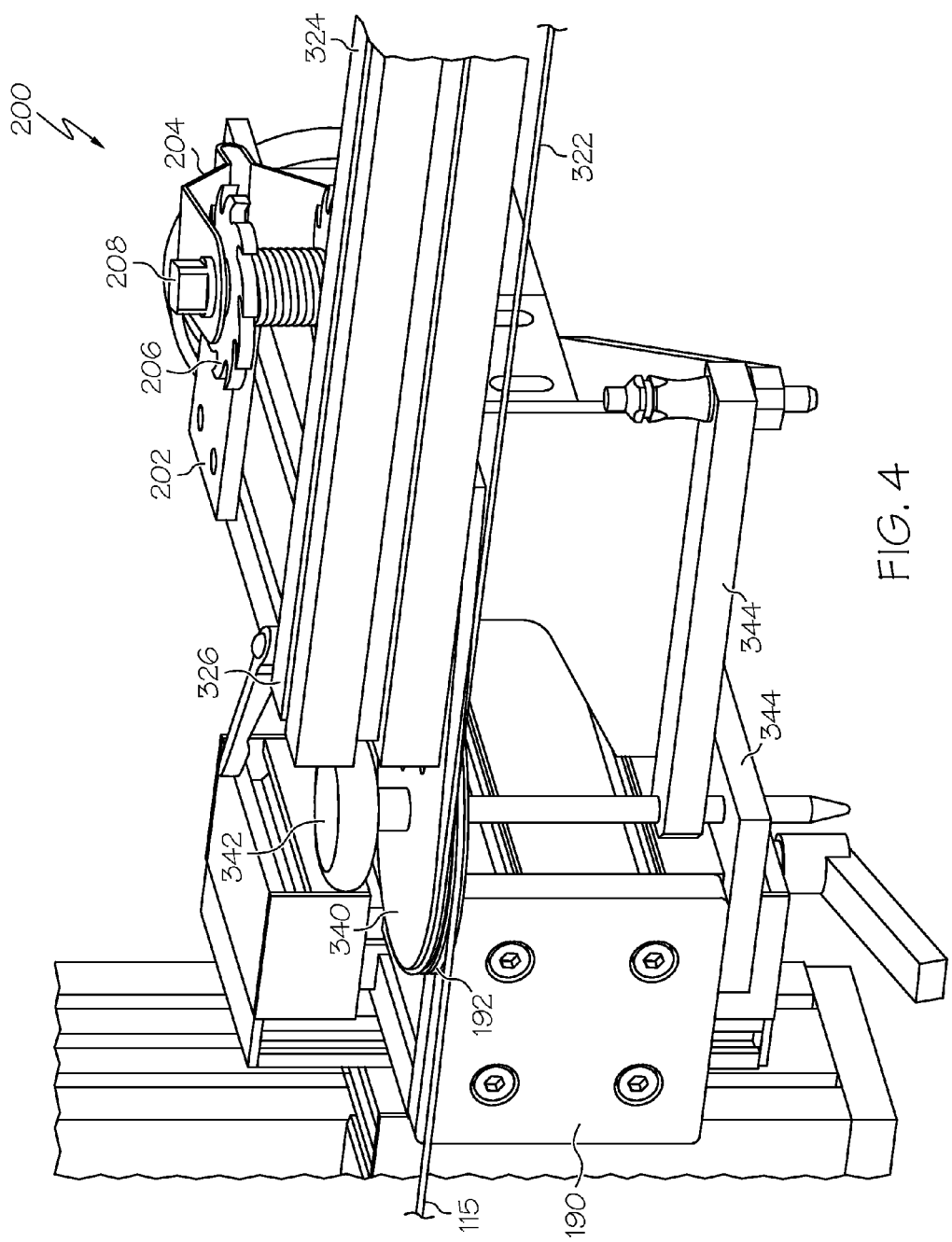
FIG. 4 is a front perspective view of an extension structure of the second example glass sheet guidance apparatus.
Figure 5:
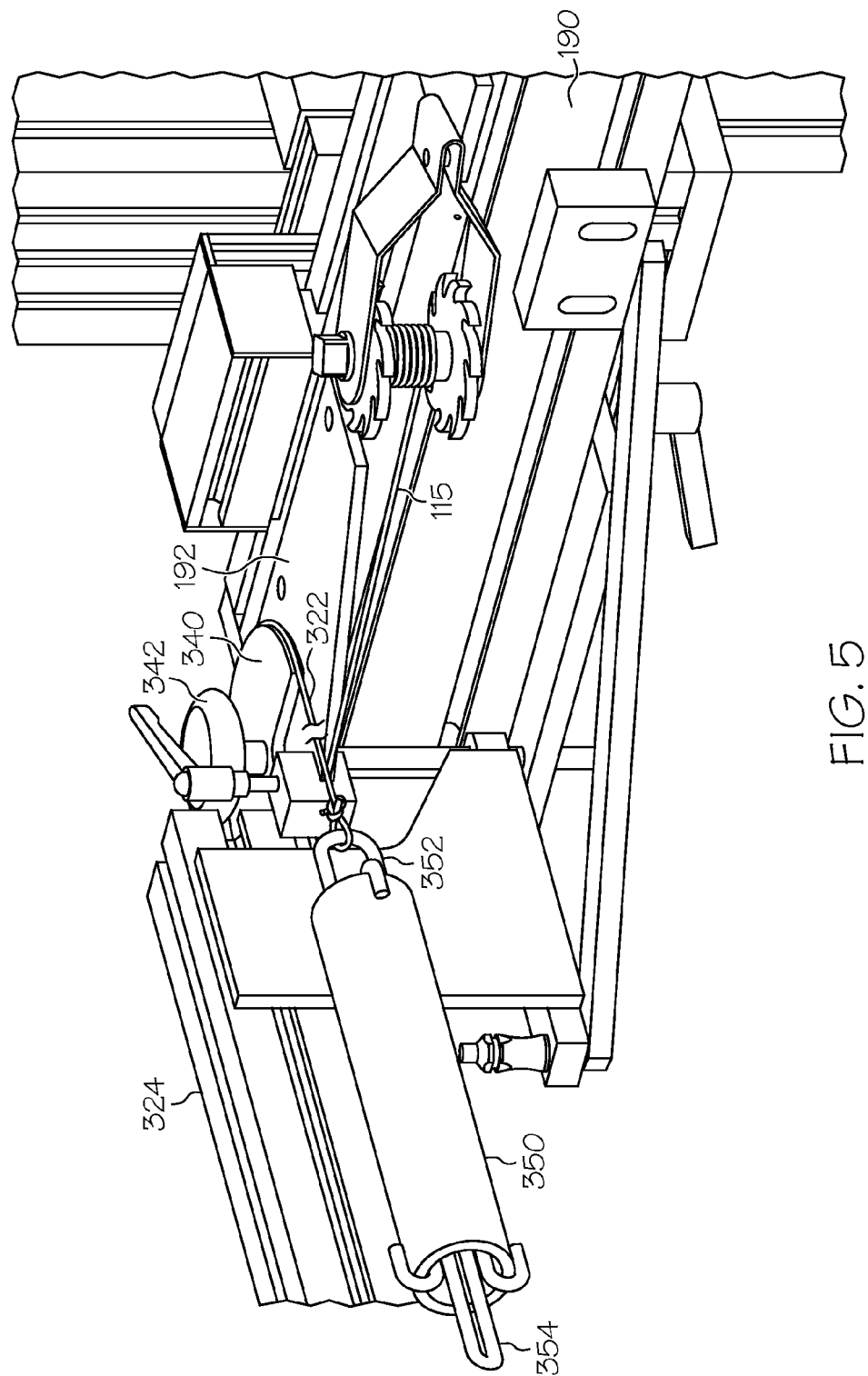
FIG. 5 illustrates a rear perspective view of the extension structure of the second example glass sheet guidance apparatus.

The second holding structure 314 can further include the third guide structure 192 (also shown in FIGS. 4 and 5). The third guide structure 192 is identical in structure and function as described above with respect to the second holding structure 114. For example, the third guide structure 192 can be attached to the second adjustment slide 190. The third guide structure 192 can be attached in any number of ways, such as with mechanical fasteners (e.g., nuts, bolts, screws, etc.), welding, adhesives, or the like. The third guide structure 192 can function to support and guide the second end portion 117 of the guidance member 115, such that the guidance member 115 is maintained to extend adjacent the conveyance path 103. The third guide structure 192 can include a stationary (e.g., non-moving) member or a moving member, such as a roller, circular roller, or the like.

The second holding structure 314 can further include the adjustment device 200. The adjustment device 200 is identical in structure and function as described above with respect to the second holding structure 114. The adjustment device 200 can support the second end portion 117 of the guidance member 115 opposite the first end portion 116. The adjustment device 200 can be attached to the second adjustment slide 190. In one example, the adjustment device 200 can include the attachment structure 202 for attaching the adjustment device 200 to the second adjustment slide 190. The attachment structure 202 can be attached to the second adjustment slide 190 in any number of ways, including, but not limited to, welding, adhesives, mechanical fasteners (nuts, bolts, screws, etc.) or the like.

The adjustment device 200 can further include the base 204. The base 204 is identical in structure and function as described above with respect to the second holding structure 114. The base 204 can be attached in any number of ways, such as with welding, adhesives, mechanical fasteners (nuts, bolts, screws, etc.) or the like. In further examples, the base 204 can be movable (e.g., pivotable) with respect to the attachment structure 202.

The adjustment device 200 can further include the gear 206 and axle 208. The gear 206 and axle 208 are identical in structure and function as described above with respect to the second holding structure 114. The gear 206 and axle 208 can be movably attached with respect to the base 204. In one example, the axle 208 extends through a center of the gear 206. The axle 208 can be movably attached at opposing ends to the base 204. As such, the gear 206 and axle 208 can both rotate with respect to the base 204. In operation, the second end portion 117 of the guidance member 115 can be attached to the axle 208. The gear 206 can be rotated in a clockwise or counter clockwise direction. As such, rotation of the gear 206 and axle 208 can cause the guidance member 115 to wind around the axle 208. By winding around the axle, the guidance member 115 is tightened, such that an overall length of the guidance member 115 extending from the first holding structure 112 to the second holding structure 114 is reduced.

The second holding structure 314 further includes the extension structure 320. The extension structure 320 can extend along the conveyance path 103 at a location downstream from the first holding structure 112 and second holding structure 314. The extension structure 320 can be attached to the third guide structure 192, such that the extension structure 320 can function to increase an overall length of the glass sheet guidance apparatus 300 that extends adjacent the conveyance path 103.

The extension structure 320 includes a second guidance member 322. The second guidance member 322 can extend along a length of the extension structure 320. Further, the second guidance member 322 can extend adjacent the conveyance path 103 along which the glass sheet 102 traverses. The second guidance member 322 can be positioned at a downstream location from the guidance member 115. Further, the second guidance member 322 can be generally continuous with respect to the guidance member 115. Accordingly, as the glass sheet 102 traverses along the conveyance path 103, the glass sheet 102 can first encounter the guidance member 115 before encountering the second guidance member 322.

The second guidance member 322 can include similar or identical structures as the guidance member 115. For example, the second guidance member 322 can include wires, cables, etc. The second guidance member 322 can have a relatively small contact area with the glass sheet 102. Depending on the particular application, the second guidance member 322 could include metal or non-metal materials, such as stainless steel, or the like. In further examples, the second guidance member 322 could include heat resistant materials for use in relatively high temperature applications. Similarly, the second guidance member 322 could include one or more coatings to increase or reduce the friction between the second guidance member 322 and the glass sheet 102. The second guidance member 322 could include any number of cross-sectional shapes, such as circular, oval, square, etc.

The extension structure 320 can further include an extension arm 324. The extension arm 324 is a generally elongate structure extending along a longitudinal axis between a first end portion 326 and an opposing second end portion 328. The extension arm 324 can extend adjacent the conveyance path 103 and can support the second guidance member 322 to extend along the conveyance path 103. The extension arm 324 can include any number of sizes and shapes, and is not limited to the example shown in FIG. 3. For example, the extension arm 324 can be longer or shorter than as shown. Similarly, the extension arm 324 could include a length adjustment device, such that the extension arm 324 can be selectively lengthened or shortened. Indeed, the extension arm 324 shown in FIG. 3 comprises only one possible example of the extension arm 324, as a number of different constructions are envisioned.

Referring now to FIG. 4, the first end portion 326 of the extension arm 324 can be described in more detail. The first end portion 326 can be attached to a first guide structure 340. The first end portion 326 can be attached in any number of ways to the first guide structure 340, such as with mechanical fasteners, adhesives, welding, or the like.

The first guide structure 340 can extend along a planar surface and can support the second guidance member 322. In one example, the first guide structure 340 has a rounded shape, such that the second guidance member 322 can wind around the first guide structure 340. In the shown example, the second guidance member 322 can form a 180° bend. The first guide structure 340 can have alignment groove into which the second guidance member 322 can be received. The second guidance member 322 can have a larger cross-sectional width than the alignment groove, such that the second guidance member 322 can protrude outwardly from the first guide structure 340.

The first guide structure 340 can be attached to the third guide structure 192. The first guide structure 340 can be attached in any number of ways. For instance, in one example, the first guide structure 340 can be attached by means of an attachment pin 342. In this example, the attachment pin 342 can extend through an opening in the first guide structure 340 and a corresponding opening in the third guide structure 192. To provide further support, support members 344 can also be provided to support both the first guide structure 340 and the extension arm 324. The support members 344 can include openings that are aligned with the openings in the first guide structure 340 and third guide structure 192. As such, the attachment pin 342 can extend through openings in each of the first guide structure 340, the third guide structure 192, and the support members 344. In addition, the attachment pin 342 can be selectively removed, such that the first guide structure 340 and, thus, the extension structure 320, can be detached from the third guide structure 192.

The above described means for attaching the first guide structure 340 to the third guide structure 192 is only one possible means for attachment. Indeed, the first guide structure 340 and the third guide structure 192 can be attached in any number of ways, including by removable or non-removable attachment. In further examples, a variety of different types of mechanical fasteners, adhesives, or the like could be used in place of the attachment pin 342 to attach the first guide structure 340 to the third guide structure 192. As such, the first guide structure 340 is not limited to including the attachment pin 342 as a means for attachment.

Referring now to FIG. 5, the extension structure 320 can further include a tension member 350. The tension member 350 is positioned on a side of the extension structure 320 that is opposite from the conveyance path 103. In one example, the tension member 350 can extend in a direction that is parallel with respect to the extension structure 320, though other orientations are envisioned. The tension member 350 can be identical in structure and function as the tension member 160 described above and shown in FIG. 2. For example, the tension member 350 can extend along a generally linear axis between a first end portion 352 and an opposing second end portion 354. The tension member 350 can include a biasing member, such as a spring. The second end portion 356 of the tension member 350 can be attached to a fixed structure 358 (shown in FIG. 6). The fixed structure 358 could, in one example, be attached to the extension arm 324. In other examples, the fixed structure 358 can include nearly any non-movable structure to which the second end portion 356 of the tension member 350 can be attached. The first end portion 352 of the tension member 350 can be attached to the second guidance member 322. As such, by being flexible, the tension member 350 can increase or decrease in length. The tension member 350 can maintain the second guidance member 322 taut, such that if a length of the second guidance member 322 changes, the second guidance member 322 can remain taut.

Figure 6:
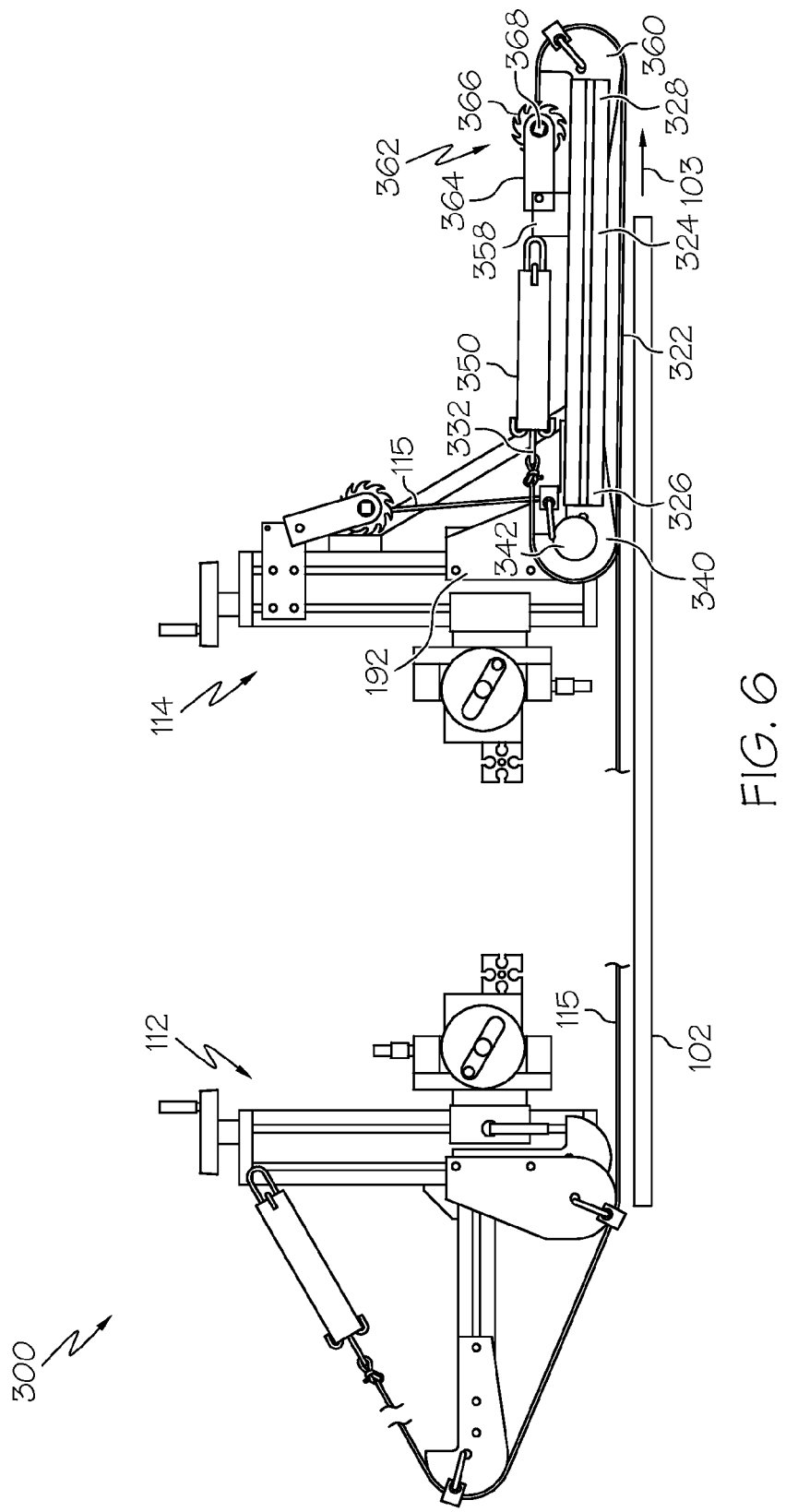
FIG. 6 illustrates a top view of the second example glass sheet guidance apparatus.

Referring now to FIG. 6, the second end portion 328 of the extension arm 324 can be seen more clearly. The extension arm 324 can be attached at the second end portion 328 to a second guide structure 360. The extension arm 324 can be attached in any number of ways to the second guide structure 360, including mechanical fasteners, adhesives, or the like. The second guide structure 360 can support and guide the second guidance member 322. The second guide structure 360 can include a stationary (e.g., non-moving) member, as shown. However, in further examples, the second guide structure 360 could also include a moving member, such as a roller, or the like. In one example, the second guide structure 360 can form a substantially 180° bend around which the second guidance member 322 can wind. However, in further examples, the second guide structure 360 is not limited to this 180° bend. The second guide structure 360 can further include an alignment groove into which the second guidance member 322 can be received. The second guidance member 322 can protrude outwardly from the alignment groove of the second guide structure 360.

The extension structure 320 can further include an adjustment device 362. The adjustment device can be identical in structure to the adjustment device 200 described above with respect to FIG. 2. For example, the adjustment device 362 can support an end of the second guidance member 322 opposite from the tension member 350. The adjustment device 362 can selectively adjust a length of the second guidance member 322 between the tension member 350 and the adjustment device 362.

The adjustment device 362 can include a base 364. The base 364 can be attached to the fixed structure 358. The base 364 can be attached in any number of ways, such as with mechanical fasteners, adhesives, or the like. The base 364 can be non-movably attached to the fixed structure 358. The adjustment device 362 can further include a gear 366 and an axle 368. The gear 366 can be movably attached with respect to the base 364. In one example, the gear 366 can include the axle 368 extending through a center of the gear 366. The axle 368 can be movably attached at opposing ends to the base 364. As such, the gear 366 and axle 368 can both rotate with respect to the base 364. In operation, the second guidance member 322 can be attached to the axle 368. In particular, an end of the second guidance member 322 can be wound around the axle 368. The gear 366 can then be rotated in a clockwise or counter clockwise direction, such that rotation of the gear 366 and the axle 368 can cause the second guidance member 322 to further wind around the axle 368. By winding around the axle 368, the second guidance member 322 is tightened, such that an overall length of the second guidance member 322 extending from the tension member 350 to the adjustment device 362 is reduced.

The operation of the glass sheet guidance apparatus 300 can now be briefly described. The glass sheet 102 can travel along conveyance path 103. The glass sheet 102 can initially be guided by the guidance member 115. Downstream from the guidance member 115, the glass sheet 102 can then be guided by the second guidance member 322. Due to the guidance member 115 winding around the third guide structure 192 at a downstream location and the second guidance member 322 winding around the first guide structure 340 at an upstream location, the glass sheet 102 is continuously guided by either the guidance member 115 or the second guidance member 322 at all times. Accordingly, while two separate guidance members are used (e.g., guidance member 115, second guidance member 322), the glass sheet 102 functionally encounters at least one of the guidance members at all times while moving along the conveyance path 103.

Figure 7:
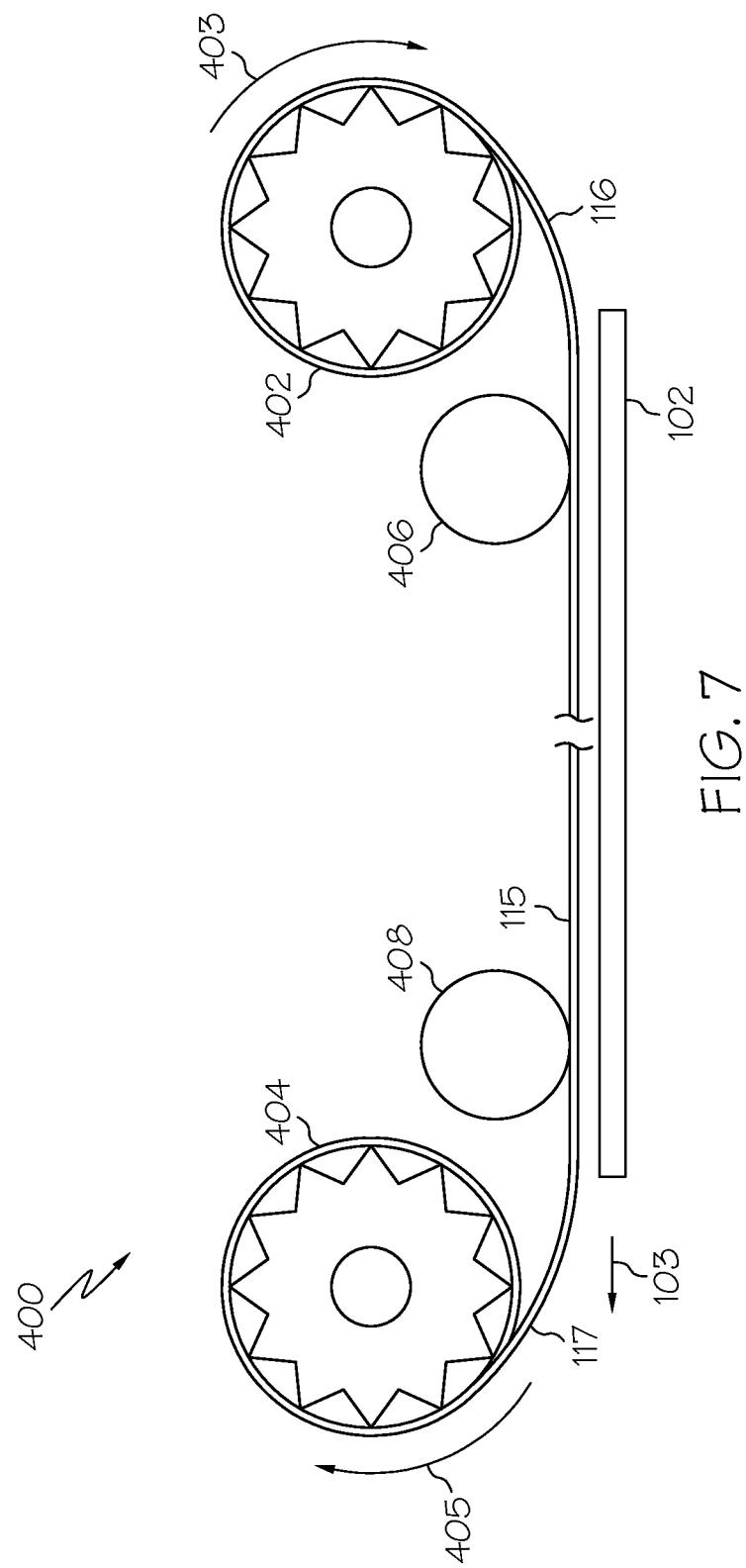
FIG. 7 illustrates a top view of a third example glass sheet guidance apparatus of a glass manufacturing apparatus.

Referring now to FIG. 7, a third example of a glass sheet guidance apparatus 400 is provided. The glass sheet guidance apparatus 400 can be used in a similar or identical environment as the glass sheet guidance apparatus 100 described above with respect to FIGS. 1 and 2. Indeed the glass sheet guidance apparatus 400 can include the guidance member 115 for guiding the glass sheet 102 along the conveyance path 103.

The glass sheet guidance apparatus 400 can include a first holding structure 402. The first holding structure 402 can support the first end portion 116 of the guidance member 115. The first holding structure 402 is shown to include a generally cylindrical shape, though a variety of shapes are envisioned. In one example, the first holding structure 402 can be attached to the first end portion 116 of the guidance member 115, with the guidance member 115 winding around the first holding structure 402. The first holding structure 402 can be movable, such as by being rotatable. Accordingly, rotation of the first holding structure 402 can cause the guidance member 115 to wind or unwind on the first holding structure 402. In one example, the first holding structure 402 can be wound in an unwinding direction 403 (e.g., clockwise direction) to cause the guidance member 115 to unwind from the first holding structure 402. However, in further examples, the first holding structure 402 could be wound in an opposite direction (e.g., counter clockwise direction) to cause the guidance member 115 to unwind from the first holding structure 402. The first holding structure 402 can further include a drive unit, such as a motor, or the like, to cause the first holding structure 402 to move.

The glass sheet guidance apparatus 400 can further include a second holding structure 404. The second holding structure 404 can be spaced apart from the first holding structure 402 and positioned with respect to the conveyance path 103. In particular, the second holding structure 404 can be positioned adjacent the conveyance path 103. The second holding structure 404 can support the opposing second end portion 117 of the guidance member 115. The second holding structure 404 is shown to include a generally cylindrical shape, though a variety of shapes are envisioned. The guidance member 115 can be wound around the second holding structure 404. The second holding structure 404 can be movable, such as by being rotatable. Accordingly, rotation of the second holding structure 404 can cause the guidance member 115 to wind onto the second holding structure 404. In one example, the second holding structure 404 can be wound in a winding direction 405 (e.g., clockwise direction) to cause the guidance member 115 to wind onto the second holding structure 404. However, as with the first holding structure 402, in further examples, the second holding structure 404 could be wound in an opposite direction (e.g., counter clockwise direction) to cause the guidance member 115 to wind onto the second holding structure 404. The second holding structure 404 can further include a drive unit, such as a motor, or the like, to cause the second holding structure 404 to move.

The glass sheet guidance apparatus 400 can further include one or more guide structures. In the shown example, the glass sheet guidance apparatus 400 includes a first guide structure 406 and a second guide structure 408. It is to be understood, however, that in further examples, the glass sheet guidance apparatus 400 could include more than the two shown guide structures, or, only one guide structure. Even further, the glass sheet guidance apparatus 400 may not include any guide structures, such that the guidance member 115 extends between the first holding structure 402 and second holding structure 404 without contacting any structures in between.

The first guide structure 406 and second guide structure 408 can be similar or identical in size and shape. For example, the guide structures 406, 408 can be generally circular in shape. The guide structures 406, 408 can be spaced apart from each other and positioned with respect to the conveyance path 103. In one example, the guide structures 406, 408 can be positioned adjacent the conveyance path 103. The first guide structure 406 can be positioned in closer proximity to the first holding structure 402 while the second guide structure 408 can be positioned in closer proximity to the second holding structure 404. In further examples, however, the guide structures 406, 408 could be positioned closer together or farther apart, and are not limited to the specific positions shown in FIG. 7.

The guide structures 406, 408 can guide guidance member 115. In particular, the guide structures 406, 408 can contact the guidance member 115 such that the guidance member 115 extends along the conveyance path 103. The guide structures 406, 408 can move (e.g., rotate), such that the guide structures 406, 408 can rotate with the guidance member 115 as the guidance member 115 moves from the first holding structure 402 to the second holding structure 404. As such, there can be relatively little friction between the guide structures 406, 408 and the guidance member 115.

The operation of the glass sheet guidance apparatus 400 can now be described. Initially, the guidance member 115 can be wound onto the first holding structure 402. The guidance member 115 can be attached at the first end portion 116 to the first holding structure 402 and at the second end portion 117 to the second holding structure 404. The guidance member 115 can extend adjacent the conveyance path 103 and can be guided by the first guide structure 406 and the second guide structure 408. As the glass sheet 102 moves along the conveyance path 103, the glass sheet 102 may contact the guidance member 115. The first holding structure 402 and second holding structure 404 can each move (e.g., rotate), causing the guidance member 115 to unwind from the first holding structure 402, move between the first holding structure 402 and the second holding structure 404, and wind onto the second holding structure 404. This movement can be driven by a drive unit, motor, or the like. The guidance member 115 can move at a speed that substantially matches a glass sheet traversal speed. The glass sheet traversal speed is the speed at which the glass sheet 102 moves along the conveyance path 103. As such, by having substantially matching speeds, there is reduced friction between the glass sheet 102 and the guidance member 115.

Figure 8:
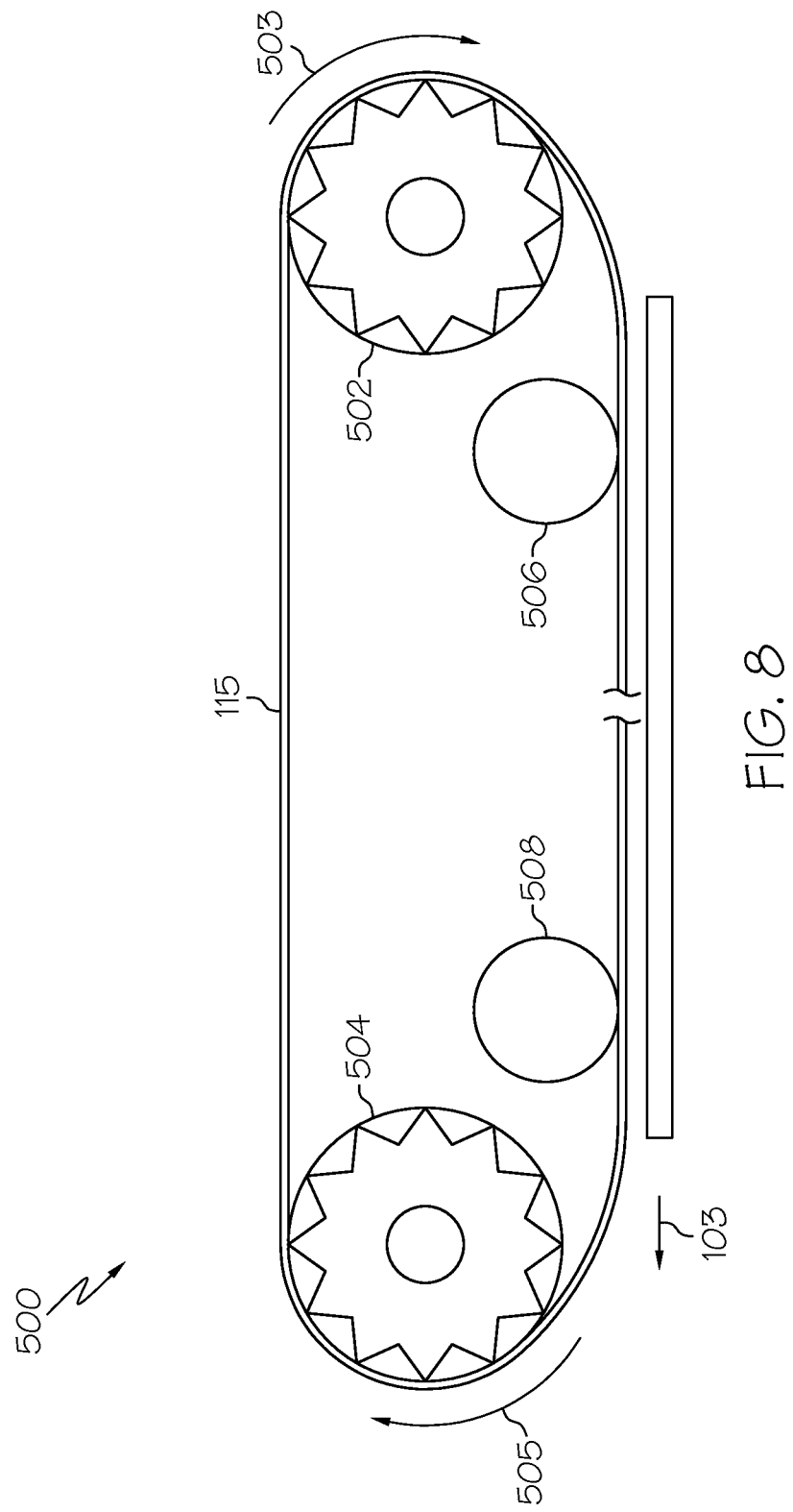
FIG. 8 illustrates a top view of a fourth example glass sheet guidance apparatus of a glass manufacturing apparatus.

Referring now to FIG. 8, a fourth example of a glass sheet guidance apparatus 500 is provided. The glass sheet guidance apparatus 500 can be used in a similar or identical environment as the glass sheet guidance apparatus 100 described above with respect to FIGS. 1 and 2. Indeed, the glass sheet guidance apparatus 500 can include the guidance member 115 for guiding the glass sheet 102 along the conveyance path 103.

The glass sheet guidance apparatus 500 can include a first holding structure 502. The first holding structure 502 can support the guidance member 115. The first holding structure 502 is shown to include a generally cylindrical shape, though a variety of shapes are envisioned. In this example, the guidance member 115 may not be attached to the first holding structure 502. Instead, the first holding structure 502 can support the guidance member 115 such that the guidance member 115 can move with respect to the first holding structure 502.

The first holding structure 502 can be movable, such as by being rotatable. Accordingly, rotation of the first holding structure 502 can support movement of the guidance member 115 along an outer circumference of the first holding structure 502. In one example, the first holding structure 502 can be rotated in a first direction 503 (e.g., clockwise direction) to cause the guidance member 115 to move. However, in further examples, the first holding structure 502 could be rotated in an opposite direction (e.g., counter clockwise direction) to cause the guidance member 115 to move in the opposite direction. The first holding structure 502 can further include a drive unit, such as a motor, or the like, to cause the first holding structure 502 to move.

The glass sheet guidance apparatus 500 can further include a second holding structure 504. The second holding structure 504 can be spaced apart from the first holding structure 502 and positioned with respect to the conveyance path 103. In particular, the second holding structure 504 can be positioned adjacent the conveyance path 103. The second holding structure 504 can support the guidance member 115. The second holding structure 504 is shown to include a generally cylindrical shape, though a variety of shapes are envisioned.

The second holding structure 504 can be movable, such as by being rotatable. Accordingly, rotation of the second holding structure 504 can cause the guidance member 115 to move with respect to the second holding structure 504. Rotation of the second holding structure 504 can support movement of the guidance member 115 along an outer circumference of the second holding structure 504. In one example, the second holding structure 504 can be moved in a first direction 505 (e.g., clockwise direction) to cause the guidance member 115 to move. However, as with the first holding structure 502, in further examples, the second holding structure 404 could be wound in an opposite direction (e.g., counter clockwise direction) to cause the guidance member 115 to move in the opposite direction. The second holding structure 504 can further include a drive unit, such as a motor, or the like, to cause the second holding structure 504 to move.

The glass sheet guidance apparatus 500 can further include one or more guide structures. In the shown example, the glass sheet guidance apparatus 500 includes a first guide structure 506 and a second guide structure 508. The guide structures 506, 508 can be identical in structure and function as the guide structure 406, 408 with respect to the example shown in FIG. 7. For example, the guide structures 506, 508 can support and guide the guidance member 115 along the conveyance path 103.

The operation of the glass sheet guidance apparatus 500 can now be described. The guidance member 115 can comprise an endless guidance member that extends along an endless path. For example, as shown, the endless guidance member 115 can comprise a loop that does not include ends or includes ends that are connected together to form the endless guidance member 115. In such examples, at least a portion of the endless guidance member 115 can extend adjacent the conveyance path 103 and can be guided by the optional first guide structure 506 and the optional second guide structure 508. As the glass sheet 102 moves along the conveyance path 103, the glass sheet 102 may contact the guidance member 115. The first holding structure 502 and second holding structure 504 can each move (e.g., rotate), causing the guidance member 115 to move along the conveyance path 103. This movement can be driven by a drive unit, motor, or the like. The guidance member 115 can move at a speed that substantially matches the glass sheet traversal speed (e.g., speed at which the glass sheet 102 moves along the conveyance path 103). As such, by having substantially matching speeds, there is reduced friction between the glass sheet 102 and the guidance member 115. In this example, since the guidance member 115 has a continuous loop shape, the holding structures 502, 504 can rotate continuously, without the need to be rewound, spooled, or the like.

As such, methods associated with glass sheet guidance apparatus of example aspects of the disclosure (e.g., FIGS. 7 and 8) can provide a guidance member 115 extending along a conveyance path 103. For example, as shown in FIGS. 7 and 8, the guidance member 115 includes a length extending along the conveyance path 103. The method can further provide the first holding structure 402, 502 holding a first portion of the guidance member 115 and the second holding structure 404, 504 holding a second portion of the guidance member 115. The first and second holding structures can hold the guidance member 115 such that the length of the guidance member 115 spans between the first holding structure and the second holding structure adjacent the conveyance path 103. For example, FIG. 7 illustrates the guidance member 115 including the first end portion 116 being unwound from the first holding structure 402 and the second end portion 117 being wound onto the second holding structure 404. In another example, as shown in FIG. 8, the guidance member 115 can comprise an endless guidance member that travels in a looped path about the first and second holding structures 502, 504.

The method associated with FIGS. 7 and 8 can also include the step of traversing the length of the guidance member 115 and the glass sheet in a common direction of the conveyance path 103, wherein the length of the guidance member guides the glass sheet 102 along the conveyance path 103. As shown in FIGS. 7 and 8, on one example, the length of the guidance member 115 and the glass sheet 102 both travel at substantially the same speed along the common direction of the conveyance path 103. As such, in some examples, substantially little relative motion exists between the guidance member 115 and the glass sheet 102. Reducing or eliminating relative motion between the guidance member 115 and the glass sheet 102 can help minimize friction and/or minimize damage to the glass sheet during conveyance. Moreover, the guidance member can be designed to conform to substantially match a shape of the glass sheet. For instance, if the glass sheet comprises a bowed configuration, the flexibility of the wire may allow the wire to conform to the shape of the glass sheet while still guiding the glass sheet along the conveyance path 103.

A method of guiding the glass sheet 102 will now be described with respect to FIGS. 9 to 11. Similar or identical method steps may be performed with further examples, for instance, as described throughout the application. Moreover, example methods of the present invention may omit and/or add additional steps. Unless noted, the steps can be performed simultaneously, sequentially, or in different orders depending on the particular application.

Figure 9:
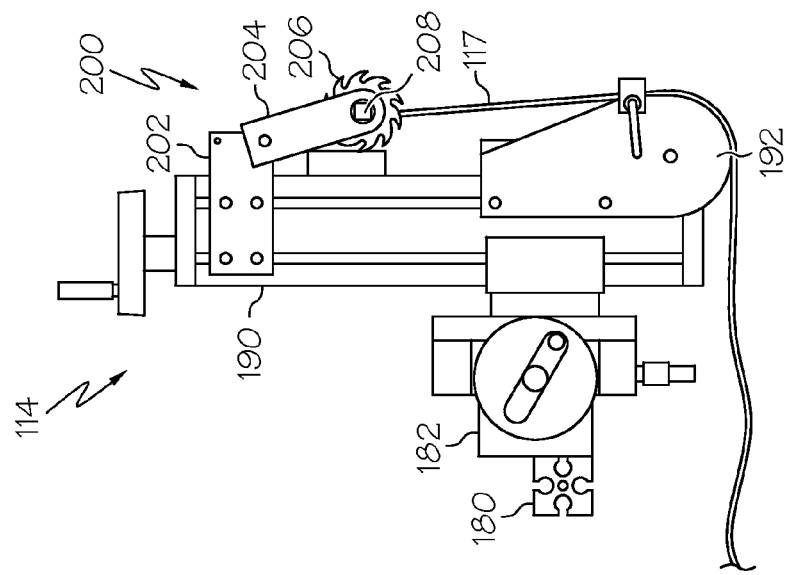
FIG. 9 illustrates a method step of adjusting a guidance member of the glass sheet guidance apparatus.
Figure 9:
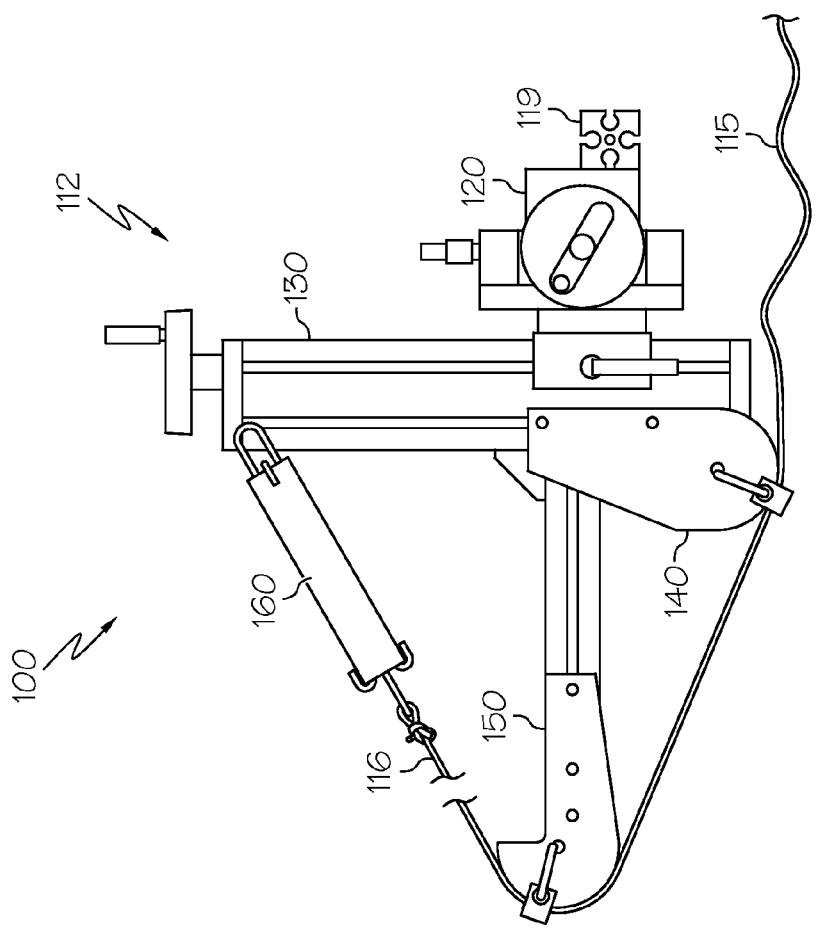

Referring to FIG. 9, the method of guiding the glass sheet 102 includes the step of providing the first holding structure 112 for supporting the first end portion 116 of the guidance member 115. Further, the method includes the step of providing the second holding structure 114 spaced apart from the first holding structure 112. The second holding structure 114 has the adjustment device 200 that supports the second end portion 117 of the guidance member 115. The guidance member 115 extends adjacent the conveyance path 103 along which the glass sheet 102 traverses. As shown in FIG. 9, the guidance member 115 can initially be in a loose, non-taut state.

Figure 10:
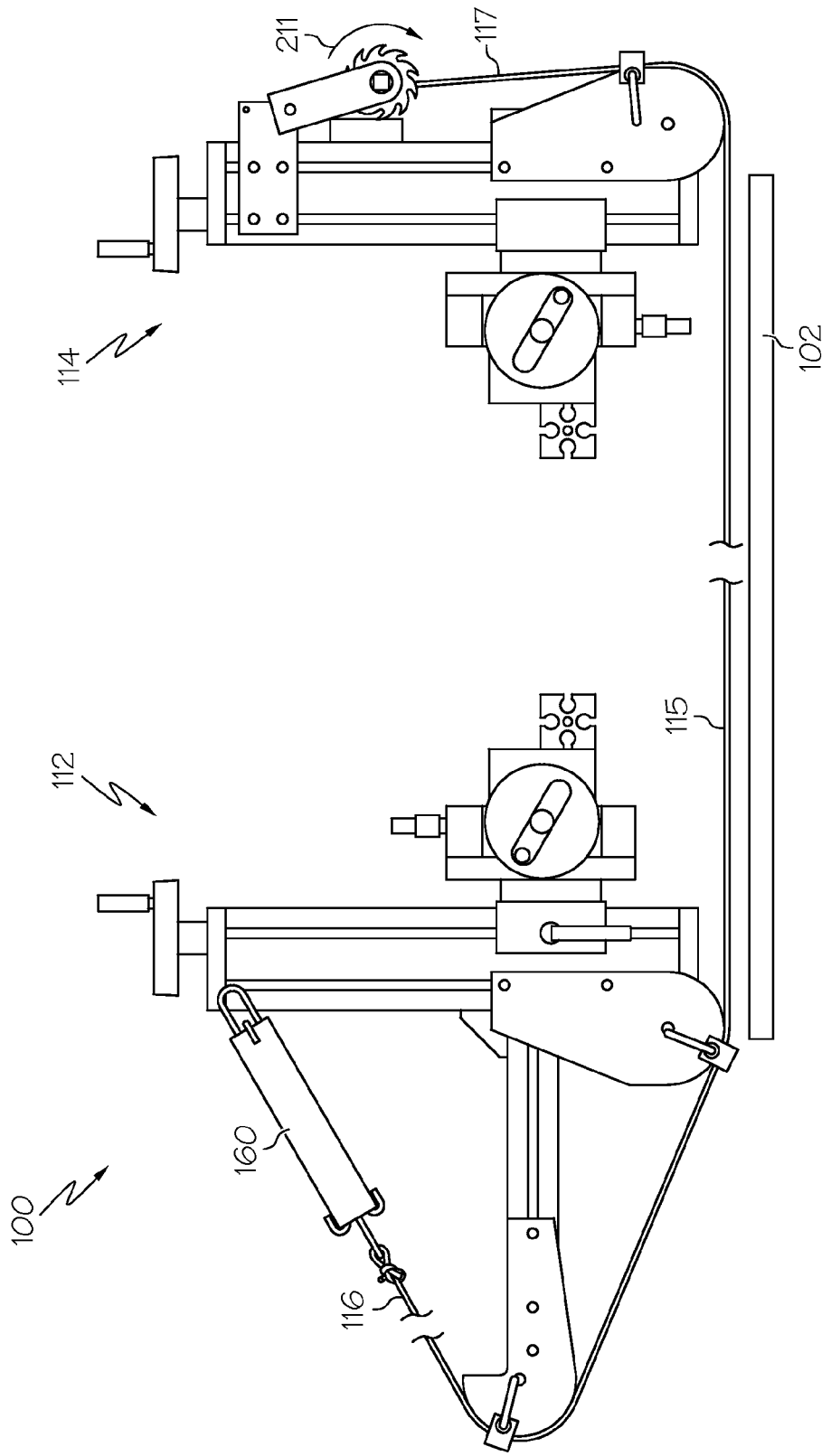
FIG. 10 illustrates a method step of tightening the guidance member of the glass sheet guidance apparatus.

Referring now to FIG. 10, the method of guiding the glass sheet 102 further includes the step of adjusting the length of the guidance member 115 with the adjustment device 200. As shown, the gear 206 and axle 208 of the adjustment device 200 can be rotated in a tightening direction 211. While the tightening direction 211 is shown to be in a clockwise direction, in further examples, the tightening direction 211 could alternatively be in the counter clockwise direction. By rotating the adjustment device 200 in the tightening direction 211, the length and tension of the guidance member 115 can be changed. In particular, the length of the guidance member 115 extending between the first holding structure 112 and second holding structure 114 is changed. In this example, the length of the guidance member 115 is shortened. Indeed, as shown, slack in the guidance member 115 has been substantially removed, such that the guidance member 115 is now taut.

The length of the guidance member 115 can be changed (e.g., lengthened or shortened) based on the thickness of the glass sheet 102. In one example, the glass sheet 102 can be relatively thinner, such that the glass sheet 102 can be more fragile and more susceptible to breaking. As a result, the guidance member 115 can be lengthened, such that the guidance member 115 is less taut, and is less likely to cause breaking of the glass sheet 102. In another example, the glass sheet 102 can be thicker, such that the glass sheet 102 is more resistant to breaking. As a result, the guidance member 115 can be shortened, such that the guidance member 115 is more taut. Therefore, the length of the guidance member 115 can be adjusted with the adjustment device 200 based on the thickness of the glass sheet 102.

Figure 11:
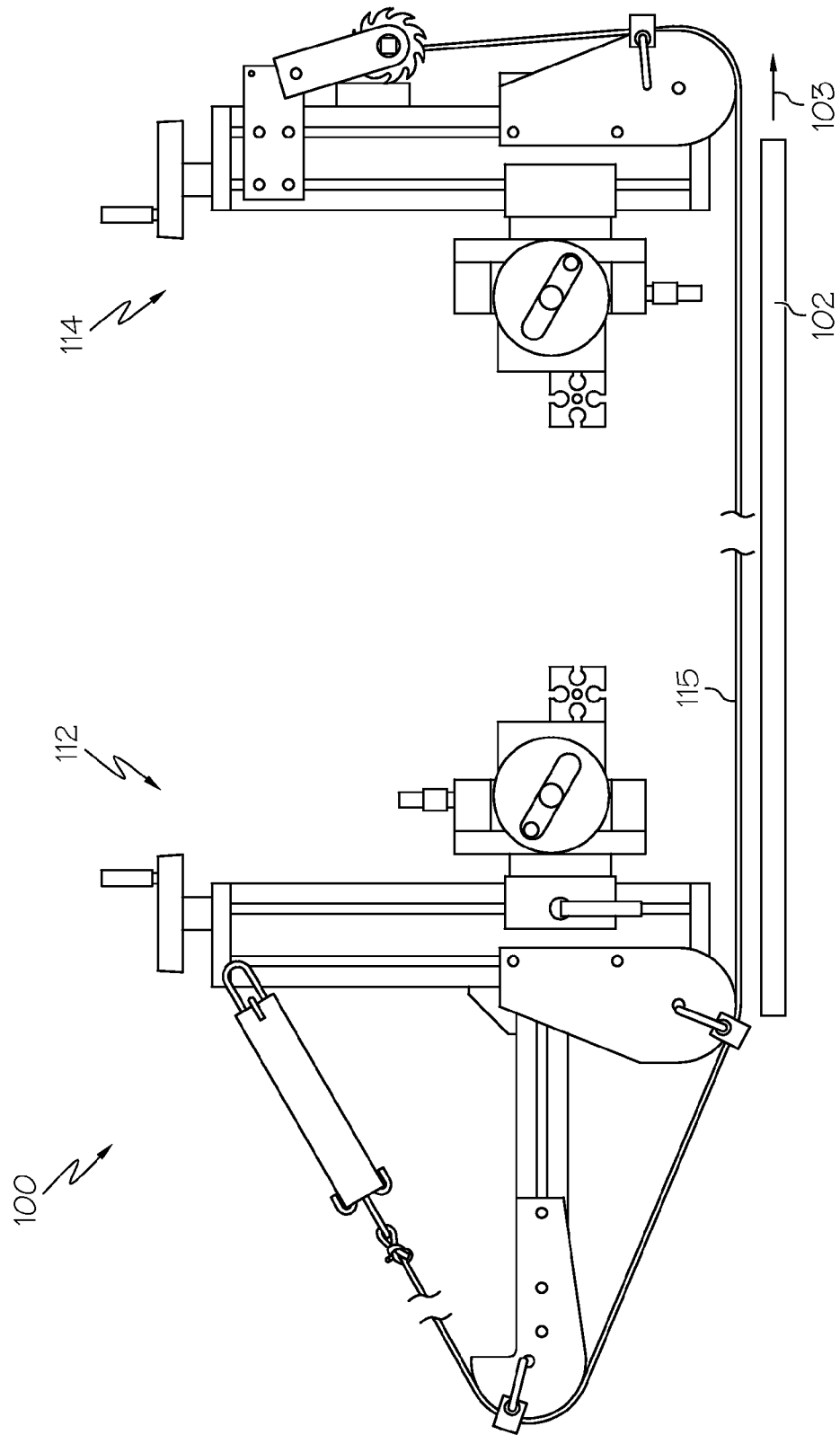
FIG. 11 illustrates a method step of traversing a glass sheet with respect to the guidance member of the glass sheet guidance apparatus.

Referring now to FIG. 11, the method of guiding the glass sheet 102 further includes the step of moving the glass sheet 102 along the conveyance path 103. As shown, the glass sheet 102 can be bounded on at least one side with the guidance member 115. The glass sheet 102 is limited by the guidance member 115 from moving in a direction transverse to the conveyance path 103. Indeed, if the glass sheet 102 moves in the transverse direction, the glass sheet 102 can contact the guidance member 115, whereupon the guidance member 115 maintains the glass sheet 102 within the conveyance path 103.

Referring briefly to FIGS. 3 to 6, further methods can comprise the step of attaching the extension structure 320 to the second holding structure 114. In particular, the extension structure 320 can be attached to the third guide structure 192 of the second holding structure 114. As such, the extension structure 320 can be positioned with respect to the conveyance path 103 such that the extension structure 320 extends adjacent the conveyance path 320 as shown in FIG. 6.

The method further comprises the step of supporting the second guidance member 322 with the extension structure 320. As shown, the second guidance member 322 is supported at a first end portion by the tension member 350. The second guidance member 322 is supported at an opposing second end portion by the adjustment device 362. As such, the second guidance member 322 can be supported by the extension structure 320 to extend adjacent the conveyance path 103 along which the glass sheet 102 traverses.

The method further comprises the step of adjusting the length of the second guidance member 322. In a similar manner as described above with reference to FIGS. 9 to 11, a length of the second guidance member 322 can be adjusted with the adjustment device 362. In particular, the gear 366 and axle 368 can be rotated, such that the second guidance member 322 can wind around the axle 368. This winding can cause the second guidance member 322 to become shorter in length or, if winding in the reverse direction, can cause the second guidance member 322 to become longer in length. As such, the length of the second guidance member 322 can be adjusted based on the thickness of the glass sheet 102.

Methods of guiding a glass sheet of the present disclosure can be used in various environments. In one example, methods of manufacturing a glass sheet may be provided that include guiding the glass sheet in accordance with any of the various examples of the disclosure. Guiding the glass sheet in accordance examples of the disclosure can facilitate effective transport of the glass sheet during the method of manufacturing the glass sheet.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. A glass sheet guidance apparatus including:
    a guidance member extending adjacent a conveyance path along which a glass sheet is configured to traverse;
    a first holding structure positioned with respect to the conveyance path, the first holding structure supporting a first end portion of the guidance member; and
    a second holding structure spaced apart from the first holding structure and positioned with respect to the conveyance path, the second holding structure including an adjustment device supporting an opposing second end portion of the guidance member, wherein the adjustment device is configured to wind or unwind the guidance member about an axle, thereby selectively adjusting a length of the guidance member extending between the first holding structure and the second holding structure.

2. The glass sheet guidance apparatus of claim 1, wherein the guidance member includes a wire.

3. The glass sheet guidance apparatus of claim 2, wherein the guidance member is conformable to substantially match a shape of the glass sheet.

4. The glass sheet guidance apparatus of claim 1, wherein at least one of the first holding structure and second holding structure includes an adjustment slide, the adjustment slide being configured to move the guidance member along at least one axis.

5. The glass sheet guidance apparatus of claim 1, further including an extension structure removably attached to the second holding structure.

6. The glass sheet guidance apparatus of claim 5, wherein the extension structure extends adjacent the conveyance path, the extension structure supporting a second guidance member configured to extend along the conveyance path.

7. The glass sheet guidance apparatus of claim 6, wherein the extension structure includes a tension member attached to a first end portion of the second guidance member.

8. The glass sheet guidance apparatus of claim 7, wherein the extension structure includes an adjustment device attached to an opposing second end portion of the second guidance member, the adjustment device is configured to selectively adjust a length of the second guidance member extending between the tension member and the adjustment device.

9. The glass sheet guidance apparatus of claim 1, wherein the first holding structure includes a pair of first holding structures, each of the first holding structures being positioned on an opposing side of the conveyance path.

10. The glass sheet guidance apparatus of claim 9, wherein the second holding structure includes a pair of second holding structures, each of the second holding structures being positioned on an opposing side of the conveyance path.

11. A method of guiding a glass sheet comprising the steps of:
    providing a first holding structure for supporting a first end portion of a guidance member;
    providing a second holding structure spaced apart from the first holding structure and having an adjustment device for supporting an opposing second end portion of the guidance member, wherein the guidance member extends adjacent a conveyance path along which the glass sheet traverses;

adjusting a length of the guidance member with the adjustment device by winding or unwinding the guidance member about an axle, thereby changing the length of the guidance member extending between the first holding structure and second holding structure based on a thickness of the glass sheet; and moving the glass sheet along the conveyance path.

12. The method of claim 11, further comprising the step of attaching an extension structure to the second holding structure, the extension structure being positioned with respect to the conveyance path.

13. The method of claim 12, further comprising the step of supporting a second guidance member with the extension structure such that the second guidance member extends adjacent the conveyance path along which the glass sheet traverses.

14. The method of claim 13, further comprising the step of adjusting the length of the second guidance member based on the thickness of the glass sheet.

15. The method of claim 11, wherein the guidance member includes a wire.

16. A method of guiding a glass sheet comprising the steps of:
providing a first holding structure for supporting a first end portion of a guidance member;
providing a second holding structure spaced apart from the first holding structure and having an adjustment device for supporting an opposing second end portion of the guidance member, wherein the guidance member extends adjacent a conveyance path along which the glass sheet traverses;
adjusting a length of the guidance member with the adjustment device by changing the length of the guidance member extending between the first holding structure and second holding structure based on a thickness of the glass sheet; and
moving the glass sheet along the conveyance path;
attaching an extension structure to the second holding structure, the extension structure being positioned with respect to the conveyance path; and
supporting a second guidance member with the extension structure such that the second guidance member extends adjacent the conveyance path along which the glass sheet traverses.

17. The method of claim 16, further comprising the step of adjusting the length of the second guidance member based on the thickness of the glass sheet.

18. A method of manufacturing a glass sheet including guiding the glass sheet, wherein guiding the glass sheet comprises the steps of:
providing a guidance member extending adjacent a conveyance path;
providing a first holding structure supporting a first end portion of the guidance member;
providing a second holding structure supporting a second end portion of the guidance member such that a length of the guidance member spans between the first holding structure and the second holding structure adjacent the conveyance path;
unwinding the guidance member from the first holding structure and winding the guidance member onto the second holding structure;
traversing the length of the guidance member and the glass sheet in a common direction of the conveyance path, wherein the length of the guidance member guides the glass sheet along the conveyance path.

19. The method of claim 18, wherein the length of the guidance member and the glass sheet both travel at substantially the same speed along the common direction of the conveyance path.

20. The method of claim 18, wherein the length of the guidance member conforms to substantially match a shape of the glass sheet.

21. A glass sheet guidance apparatus including:
a guidance member extending adjacent a conveyance path along which a glass sheet is configured to traverse;
a first holding structure positioned with respect to the conveyance path, the first holding structure supporting a first end portion of the guidance member;
a second holding structure spaced apart from the first holding structure and positioned with respect to the conveyance path, the second holding structure including an adjustment device supporting an opposing second end portion of the guidance member, wherein the adjustment device is configured to selectively adjust a length of the guidance member extending between the first holding structure and the second holding structure; and
an extension structure removably attached to the second holding structure, wherein the extension structure extends adjacent the conveyance path, the extension structure supporting a second guidance member configured to extend along the conveyance path.

22. The glass sheet guidance apparatus of claim 21, wherein the extension structure includes a tension member attached to a first end portion of the second guidance member.

23. The glass sheet guidance apparatus of claim 22, wherein the extension structure includes an adjustment device attached to an opposing second end portion of the second guidance member, the adjustment device is configured to selectively adjust a length of the second guidance member extending between the tension member and the adjustment device.

* * * * *